Inventors
Gilbert L. Stancliff, Jr.
Henry Gordon Jennings
Barkdew & Scantlebury
Attys

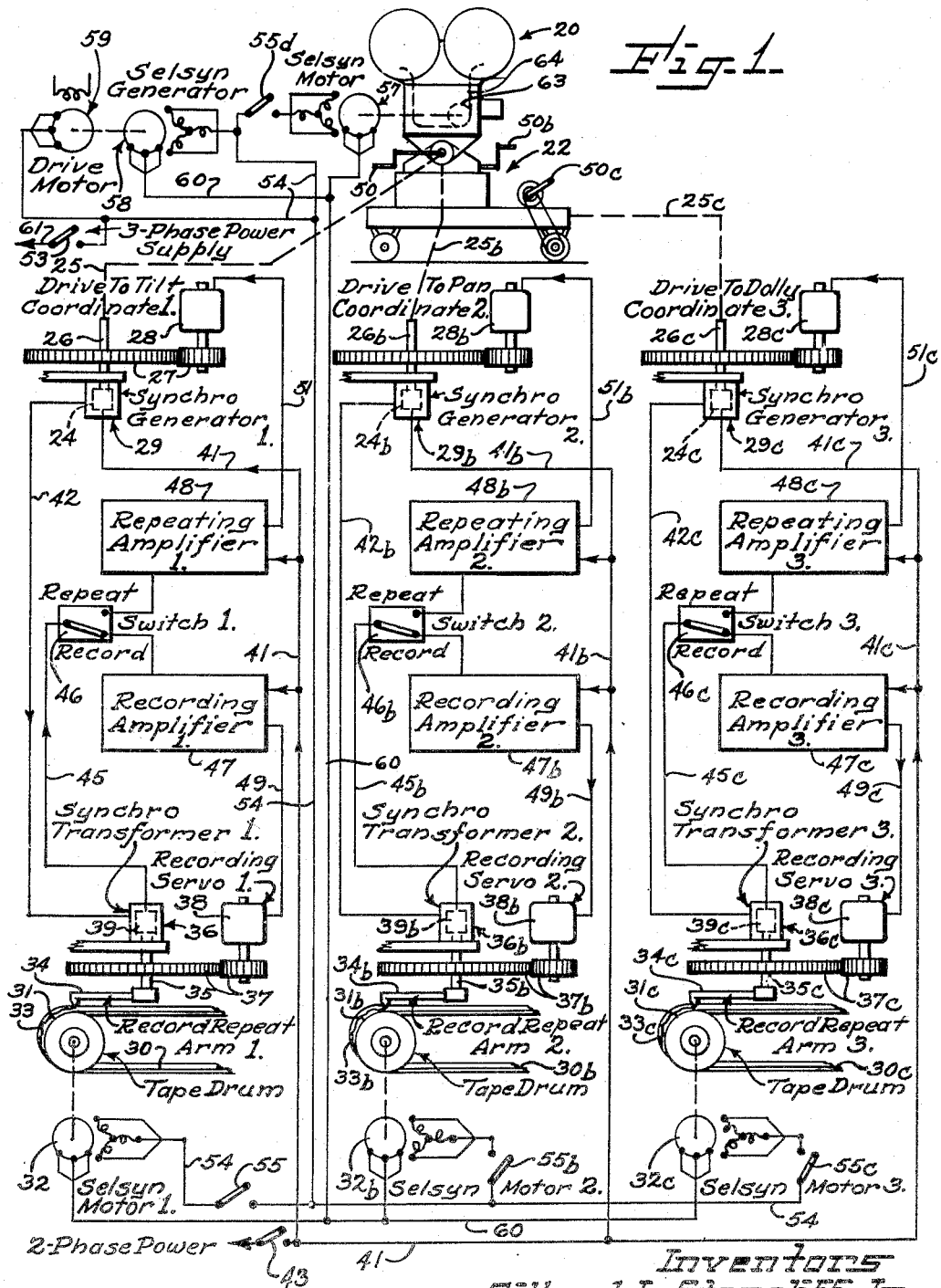

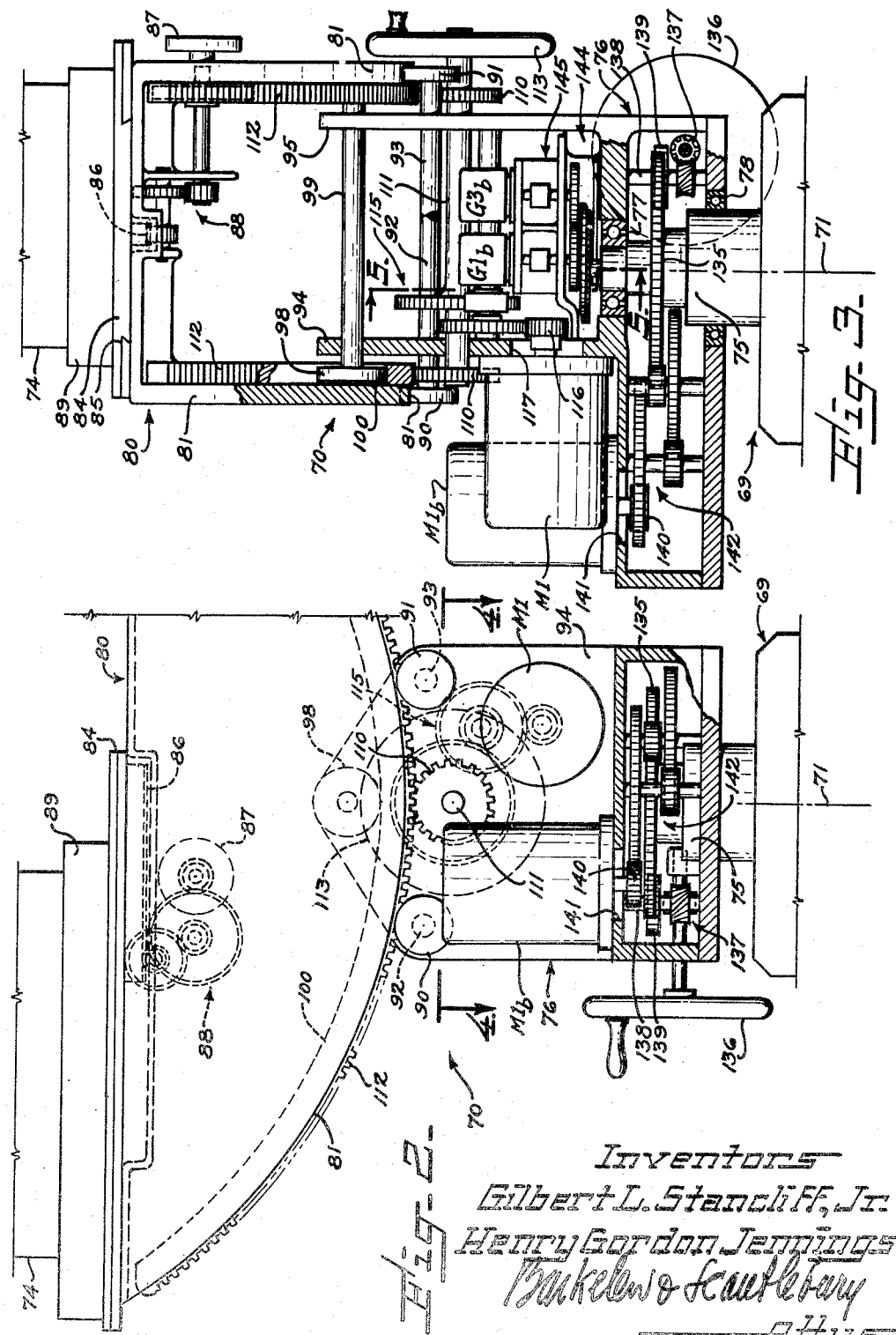

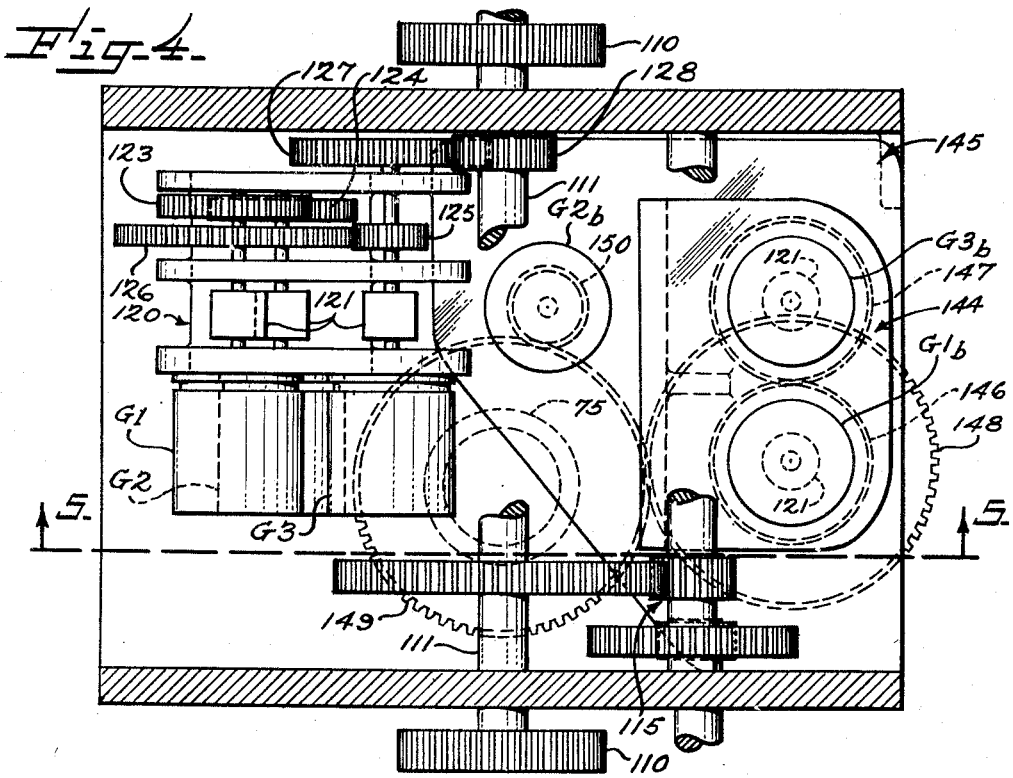
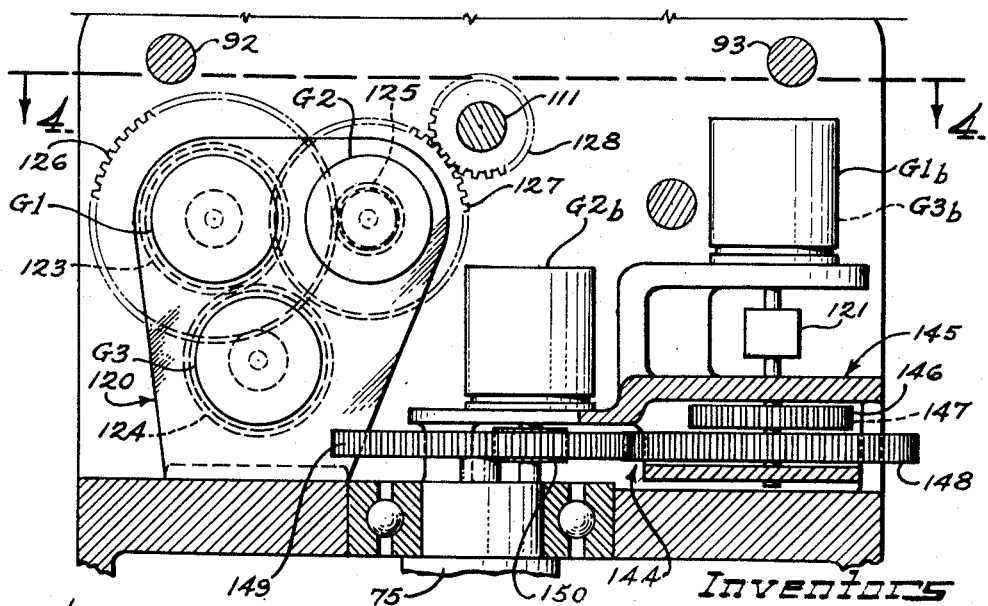

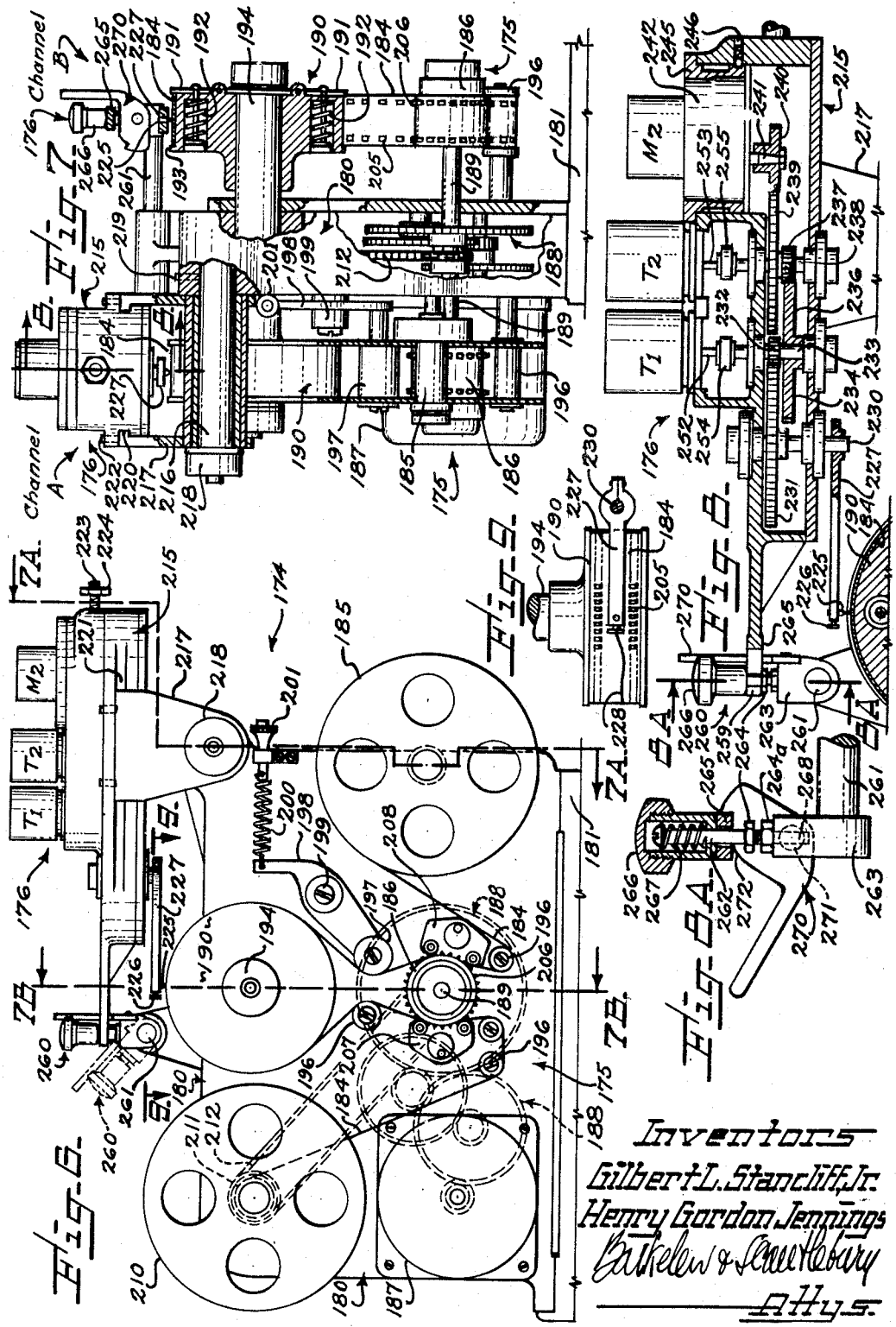

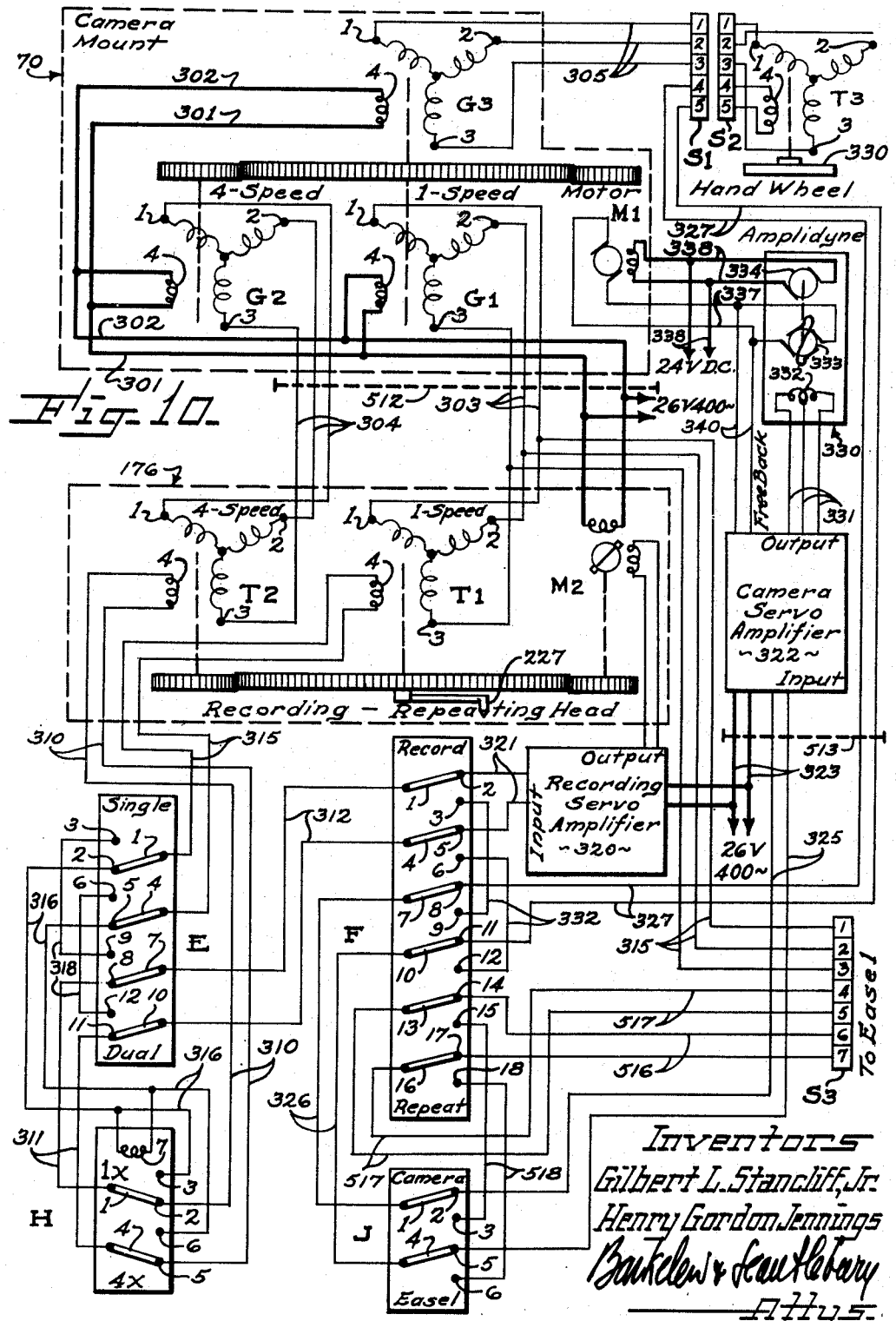

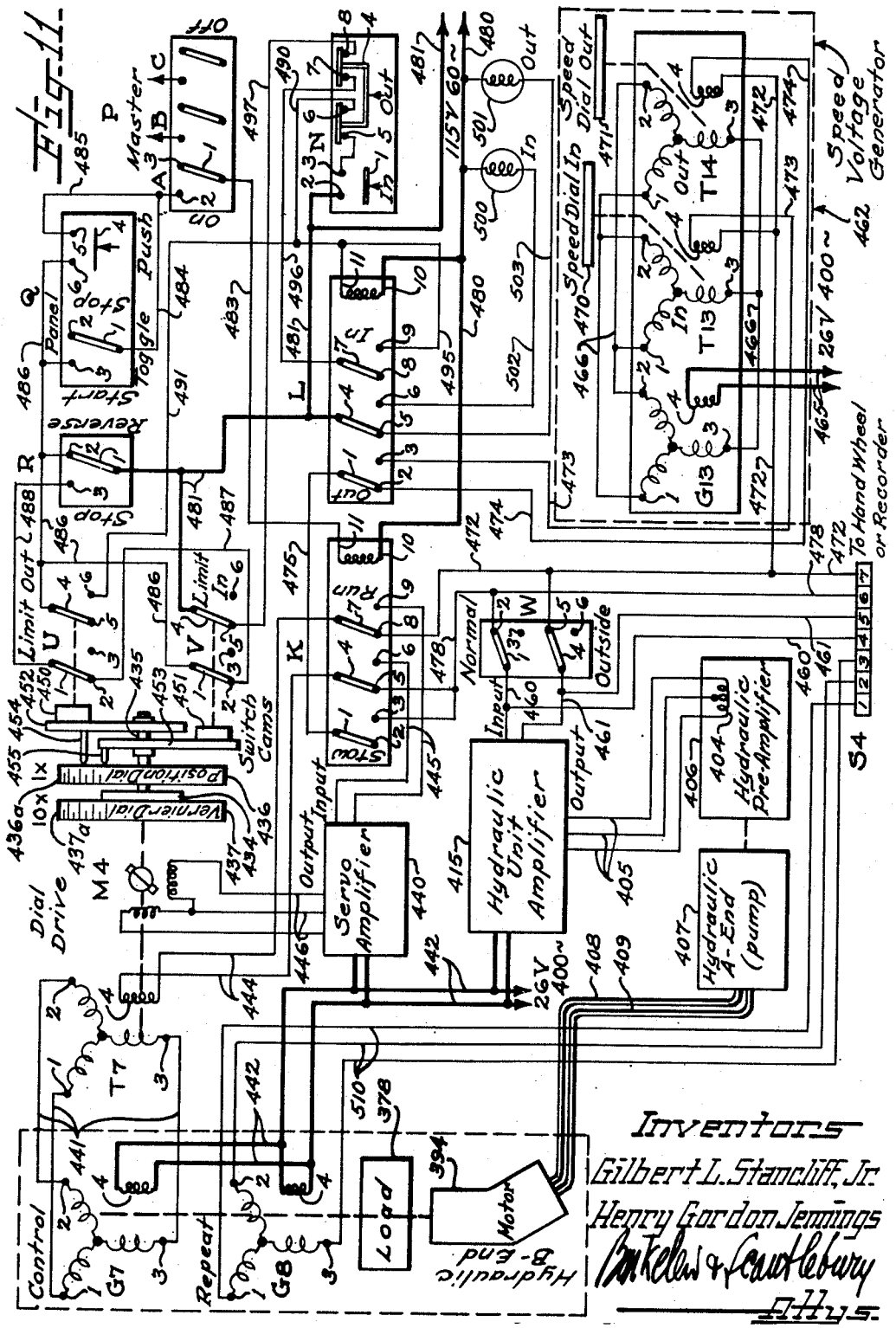

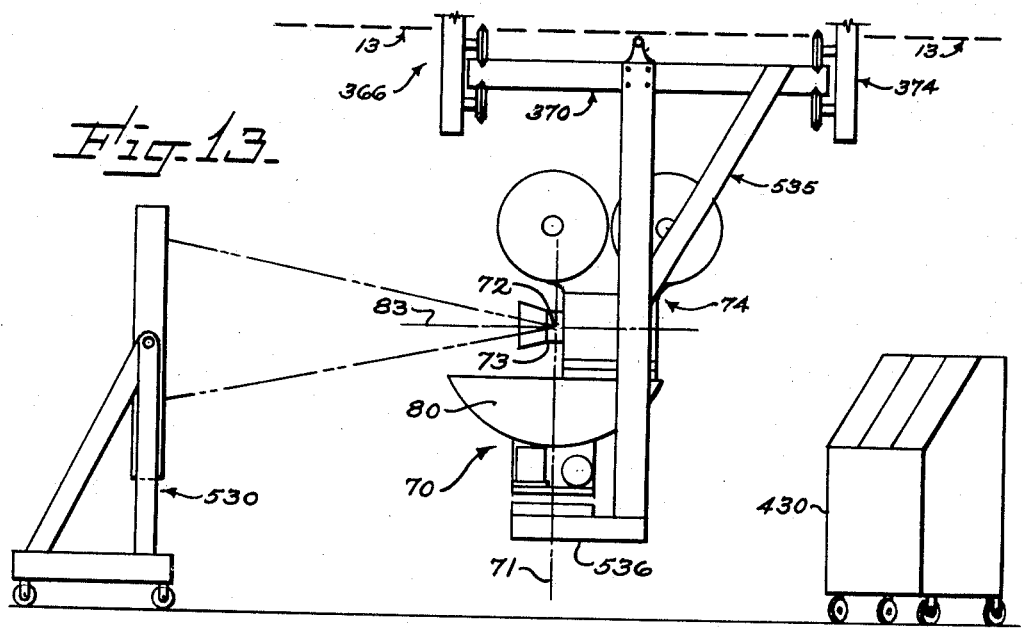
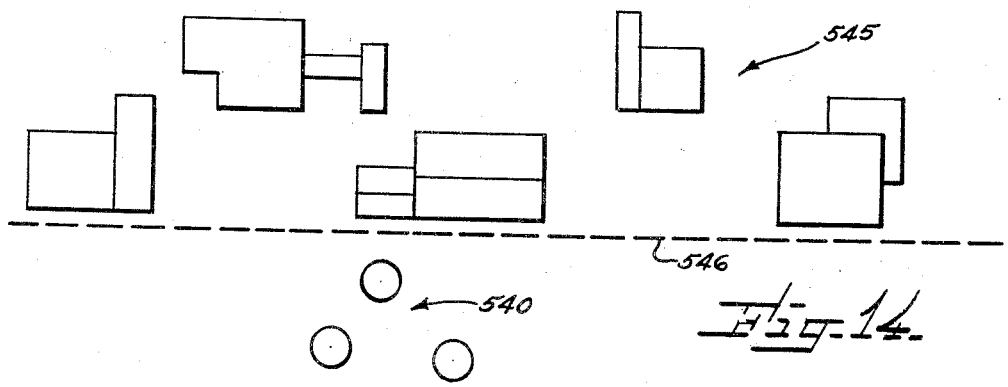
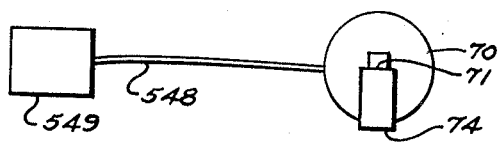
Inventors
Gilbert L. Stancliff, Jr.
Henry Gordon Jennings

UNITED STATES PATENT OFFICE 2,648,252

CONTROL OF CAMERA-SUBJECT MOTION IN MOTION-PICTURE PHOTOGRAPHY

Gilbert L. Stancliff, Jr., Burbank, and Henry Gordon Jennings, Los Angeles, Calif., assignors, by mesne assignments, to Paramount Pictures Corporation, a corporation of New York Application September 17, 1948, Serial No. 49,756

1 Claim. (Cl. 88—16)

This invention is concerned generally with methods and apparatus for taking motion pictures in which there is relative motion between the camera and the subject as a whole. The invention relates more particularly to procedures wherein various portions of such relatively moving subjects are photographed separately and combined photographically by any of the usual methods of composite photography.

An important purpose of the invention is to provide means by which the relative position and orientation of camera and subject can be varied automatically through a predetermined pattern of motion. Thus a selected pattern of motion can be repeated by setting the control system for the desired pattern and allowing the pattern to be automatically produced repeatedly.

The invention further permits an arbitrary pattern of relative motion to be recorded in convenient and durable form, and to be repeated at any later time. The original motion pattern may be produced by the automatic controls just referred to, or may be a completely arbitrary motion such as results, for example, from manual operation of the usual camera hand wheels. In either instance, when the motion is repeated, that repetition may be made so accurate that the ordinary procedures of composite photography are applicable. Thus the invention has the important result of opening up virtually a new field for composite photography, namely that in which there is relative movement of an arbitrary kind between the camera and the subject as a whole.

The most satisfactory type of apparatus for carrying out the invention depends upon the type of motion picture sequence that is to be photographed. Under some conditions the usefulness of repeating the relative motion of camera and subject requires an extreme degree of accuracy, say, within a few minutes of arc, equaling or at least approximating the limit of resolution of the photographic process itself. That is generally true, for example, in photographing successively separate color components of a subject which are subsequently assembled as a composite; or in photographing successively different portions of a subject which must match in detail in the final composite print. In other instances, a less accurate repetition of the relative motion, say within a quarter of a degree or more, is sufficient, as when a cloud background is to be introduced into a landscape sequence involving camera motion.

The invention is useful also under many conditions not involving composite photography. For example, when a scene involving a relatively complex program of camera motion must be retaken several times, the automatic repetition of that motion, even with moderate accuracy, may give more uniformity than can be obtained manually, and avoids the possibility of error in following the set program. It may be important in repeated motion to obtain great accuracy in the time at which variations of motion occur, as, for example, in a dance sequence in which camera motion must be synchronized with music already recorded. A sequence requiring such time accuracy may or may not require similar accuracy in the space coordinates of the motion.

When the required relative motion of camera and subject takes place in several distinct coordinates, each of those coordinates is preferably treated independently, both as to the means for producing and controlling the initial motion and as to the means for recording and repeating the motion. Thus one unit or channel of the recording-repeating mechanism is preferably provided for each component of motion. The various channels may be closely associated physically, as by employing common power sources, mechanical supports and housings, etc., but they preferably are capable of functioning independently of each other. Interactions of various types between the different channels may be introduced as required, but for most purposes it is sufficient to provide an accurate correlation between the time scales of the different channels, so that the time relations between motion in the corresponding coordinates will be correctly reproduced. Such a time correlation is ordinarily provided by starting the recording channels in unison and operating them at the same speed or at definitely related speeds.

The actual record of the camera-subject motion in any one coordinate is made, according to a preferred embodiment of the invention, by scribing a line lengthwise of a moving record strip or tape, the transverse position of the line on the strip corresponding at every instant to the momentary value of the coordinate. The record tape is preferably drawn longitudinally at uniform speed over a surface, which may be fixed, or may move with the tape, while a scribing tool is held in scribing relation to the tape and is so linked to the camera or subject that it moves transversely of the tape directly proportionally to the associated coordinate of camera-subject motion. To repeat the motion, the tape is drawn under a following tool which follows the transverse motion of the record line, and which is so linked to the camera or subject as to reproduce proportionally the original motion.

The type of linkage used is preferably capable of giving high accuracy, and, particularly in the case of the repeating linkage, must exert a relatively great force or torque upon the driven element with a relatively small reaction force upon the controlling element. These requirements are met by using linkages of the servo type involving a closed control circuit between driven and control elements. One branch of that control circuit includes a source of external power which acts under control of a differential device in the other branch of the circuit, and which drives the driven element in a manner directly corresponding to any arbitrary motion of the controlling element. Hence the reaction force on the latter is only that of the differential device, which can be made negligibly small. The nature of the correspondence between the motions of driven and controlling elements is determined primarily by the differential device, and can be varied greatly to suit requirements.

By suitable choice of the linkages used (that is, of the differential devices of the servo systems), the factors of proportionality between the camera-subject motion and the transverse motion of the scribing and repeating tools can be so adjusted as to compress the original camera-subject motion into the available tape width during recording; and to expand the motion of the repeating tool correspondingly to give a repeated camera-subject motion of the desired scale. Ordinarily the repeated motion duplicates the original motion, but under certain conditions it is desirable to use a different factor of proportionality in the recording and repeating linkages, leading to repetition of the motion at a different scale, including the possibility of a different time scale. The invention also includes the possibility of reproducing the original motion with a scale factor which is variable. For example, the scale factor at which a translational motion is reproduced may be varied in accordance with the value of a rotational coordinate.

A clear understanding of the invention, and of its further objects and advantages will be had from the following description of two illustrative mechanisms for obtaining relative motion between camera and subject, and a preferred form of apparatus for recording and repeating any such motion. It will be clear from that description how the invention may be carried out with respect to other types of motion, when greater or less accuracy of reproduction is needed, and under similarly varied conditions. It is not intended that the scope of the invention be limited by details of this illustrative description or of the accompanying drawings, but that scope is defined by the appended claims. In the drawings:

Fig. 1 is a functional diagram of a rudimentary system in accordance with the invention, for recording arbitrary camera motion in three dimensions and repeating that motion an indefinite number of times;

Fig. 2 is a fragmentary side elevation, partially broken away and somewhat simplified for clarity, showing a typical camera support in accordance with the invention;

Fig. 3 is an end elevation of the camera support of Fig. 2, partially broken away and similarly simplified;

Fig. 4 is a horizontal fragmentary section at enlarged scale, taken as indicated by lines 4—4 in Figs. 2 and 5;

Fig. 5 is a fragmentary vertical section taken as indicated by the lines 5—5 of Figs. 3 and 4, and at the scale of Fig. 4;

Fig. 6 is a side elevation of a typical dual channel recording-repeating mechanism in accordance with the invention;

Fig. 7 is an end elevation of the mechanism of Fig. 6, showing portions in section as indicated by the lines 7A—7A and 7B—7B of Fig. 6;

Fig. 8 is a horizontal section at enlarged scale, taken on line 8—8 of Fig. 7;

Fig. 8A is a vertical section at enlarged scale, taken on line 8A—8A of Fig. 8 showing the arm latch in locking position;

Fig. 9 is a fragmentary section on line 9—9 of Fig. 6;

Fig. 10 is a schematic diagram of a preferred electrical system for use with a camera support and recording-repeating mechanism such as are shown in Figs. 2-9;

Fig. 11 is a schematic diagram of a preferred electrical system for use with a movable support such as that in Fig. 12;

Fig. 13 is a schematic elevation, corresponding to the portion of Fig. 12 below the line 13, and illustrating the use of the movable support of Fig. 12 as a camera support; and Fig. 14 is a schematic plan, illustrating a typical photographic procedure.

Figure 12:
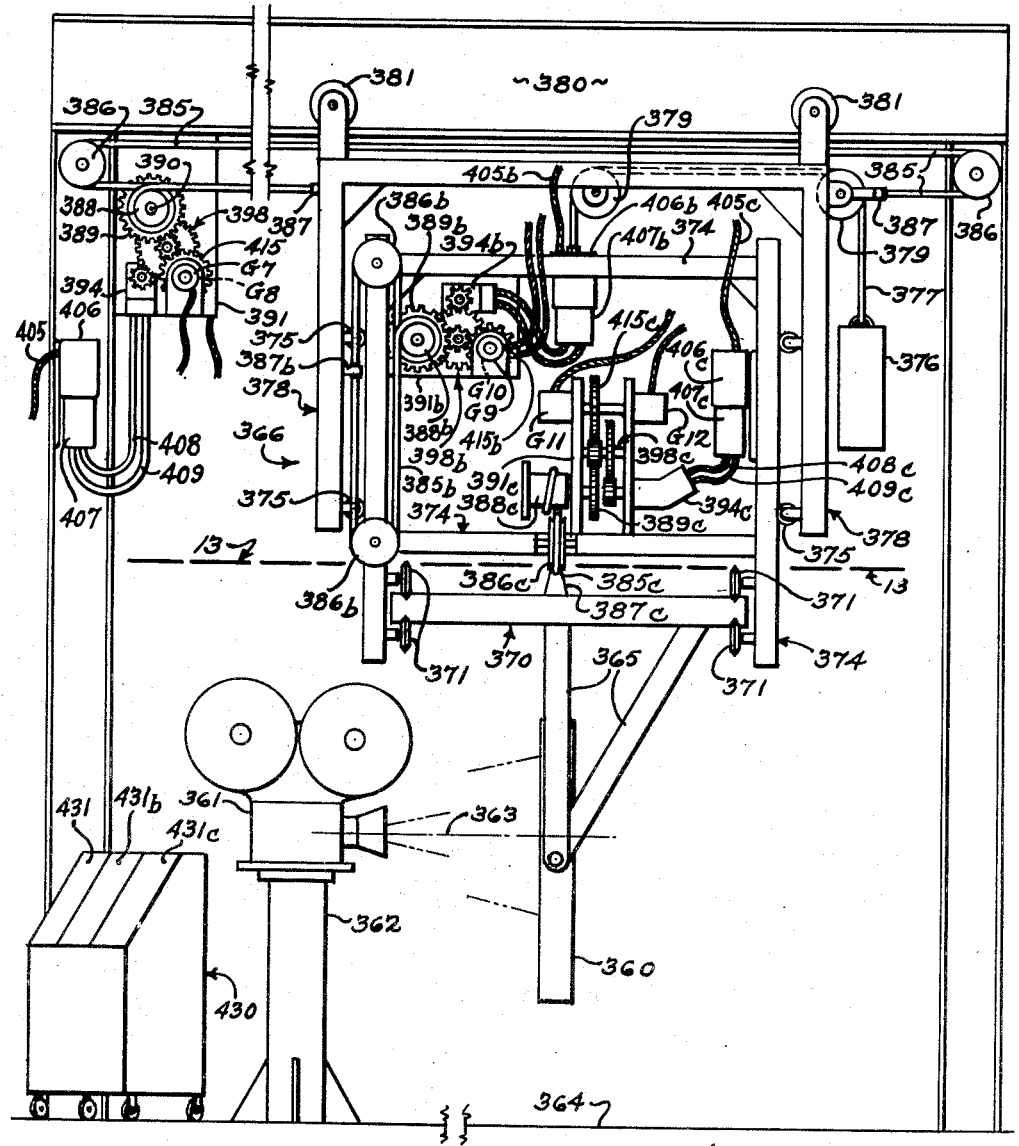
Fig. 12 is a schematic elevation of a subject support adapted for providing controlled motion in three coordinates.

Fig. 1 is a functional diagram representing a camera support 22 having controllable motions in three coordinates, namely, tilt (swinging in a vertical plane), pan (swinging in a horizontal plane) and dolly (translational movement along a line); and a recording repeating system comprising three channels associated respectively with those coordinates. Since the principle of operation of all three channels is the same, only the first will be described in detail.

The tilt motion of camera 20 on its support 22 is connected by any suitable linkage, indicated by the dashed line 25, to a shaft 26, which is positively connected directly or through gearing such as 27 with a reversible servomotor 23 and also with the rotor 24 of a synchro generator 29. The units just mentioned are ordinarily physically supported on camera mount 22. The recording-repeating unit proper, associated with the tilt motion, comprises means for supporting and uniformly driving a recording tape 30, such means being indicated in Fig. 1 by the tape drum 31 and the synchronous A. C. motor 32, in driving relation to the drum; and a transversely swingable arm 34 adapted to carry at its end alternatively means for cutting or otherwise scribing a line 33 in tape 30, or means for following a line already carried by the tape. Arm 34 is shown extending radially from a shaft 35 which is connected directly to the rotor 39 of the synchro transformer 36, and is connected by the gear train 37 to the reversible servomotor 38.

The rotor 24 of synchro generator 29 is electrically connected via cable 41 (representing two conductors) through switch 43 to a source of alternating current of suitable frequency, and its stator coils are connected via cable 42 (representing three conductors) to the stator coils of synchro transformer 36. The rotor 39 of transformer 36 is thus subjected to an alternating magnetic field, the direction of which depends upon the rotational position of the rotor of synchro generator 29; and the alternating signal voltage induced by that magnetic field in the transformer rotor 39 thus depends in magnitude and phase upon the relative rotational positions of the two rotors. In particular, if the rotors are so oriented as to produce zero signal voltage, their positions may be said to correspond. The tilt position of camera 20 and the transverse position of arm 34 with respect to tape 30, being positively linked to the respective rotors 24 and 39, then similarly correspond. Thus a definite correspondence between camera tilt and arm position is defined by the succession of relative positions for which the signal produced from transformer 36 is zero. If the said correspondence does not obtain, an alternating current error signal is produced in the rotor 39 of synchro transformer 36, the amplitude and phase (with relation to the phase in line 41) of the signal varying with and indicating the magnitude and direction of the error. That signal is transmitted via cable 45 through double throw switch 46 to recording amplifier 47 if a camera motion is being recorded on tape 30, and to repeating amplifier 48 if a previously made record on tape 30 is being used to control the camera tilt. In the former instance, the error signal, after amplification and phase-sensitive rectification in recording amplifier 47 is supplied via line 49 to recording D. C. servomotor 38 as a D. C. potential of appropriate size and direction to drive arm 34 in such a direction as to reduce the error signal. With a suitably designed and constructed system, that action results in arm 34 following very accurately the tilt motion of the camera, in the sense of the definite correspondence described above. Thus the resulting record line 33 scribed on moving tape 30 correctly represents the tilt motion of the camera as a function of time. While making such a record, the camera tilt can be manipulated in any convenient way, for example by the tilt hand wheel ordinarily provided on the camera mount and indicated schematically at 50, or by remote control means to be described.

When a sequence of tilt motion, previously recorded on tape 30, is to be repeated, the tape is moved by motor 32 under arm 34 at the same speed that was used for recording. Arm 34 is now provided with means for following the record line 33 in tape 30, and the arm is thereby constrained to swing with its shaft 35 in the same time sequence of motion which it followed while the record line was recorded. Recording servomotor 38 is preferably disconnected from shaft 35, to reduce the load imposed upon the record following means. If the position of the camera about its tilt axis does not correspond to the record-controlled position of arm 34, an error signal is generated in rotor 39 of synchro transformer 36 and is transmitted now through switch 46 in its repeat position to repeating amplifier 48. After amplification, rate anticipation and phase-sensitive rectification, the error signal is applied as a driving voltage of appropriate sign via cable 51 to repeating servomotor 28, which then alters the camera tilt in a direction to reduce the error. In practice that corrective action holds the error to a very small value at all times. Thus the camera tilt position at every instant of the repeat motion is substantially identical with that at the corresponding instant of the original motion. Power to drive the camera during the repeat motion comes primarily from amplifier 48, and the reaction of arm 34 upon the record line 33 which guides it is very small. Hence the record line may comprise, for example, a scribed line in a relatively soft material such as ordinary motion picture film. A record line a few thousandths of an inch deep in such material has been found to show no noticeable wear after as many as 100 repeating runs.

As indicated in Fig. 1, separate record strips 30b, 30c are used to record the pan motion and the dolly motion respectively, separate channels being provided for recording and reproducing the motion in each coordinate. Those channels may be all identical in their principle of operation, and are so represented in Fig. 1, where corresponding parts in the pan and dolly channels are denoted by the same numerals as in the tilt channel, but with addition of suffixes -b and -c respectively. The description given above for operation of the tilt channel is also applicable to each of the other channels, if -b or -c suffixes are added to the numerals and other obvious changes in terminology are made.

When all three channels are in operation the motion of the three record tapes 30, 30b and 30c must ordinarily be synchronized with each other. That can be done, for example, by mechanically linking together the three film drums 31, 31b and 31c. Alternatively, the tape drives may be mechanically independent, but linked electrically, as by use of synchronous interlock drive motors 32, 32b and 32c supplied with alternating current from the same source and under control of a single switch or its equivalent.

An important feature of the invention, as ordinarily carried out, is the synchronization of the tape drives in the various channels of the recording mechanism with the camera drive motor. The latter is indicated at 57, mechanically connected to the intermittent mechanism 63 by which film 64 is drawn through camera 20. With such synchronization, there is a definite relation between the longitudinal position of a particular frame on the motion picture film 64 and the longitudinal positions on the respective recording tapes 30 for which the records 33 correspond to the position of the camera at the time that frame was exposed. Typical driving means for synchronizing the camera and the recording-repeating drums 31 are indicated in Fig. 1, and are generally similar to the usual interlock drive employed for synchronizing the camera and a sound recording system. The tape drive motors 32, 32b and 32c, as well as camera motor 57, are of self-synchronous, or selsyn type, driven from a selsyn generator 58, which is mechanically connected to a drive motor 59. The rotors of the selsyn motors and of generator 58 are interconnected in parallel via cables 60, which represent the usual 3 wires of a 3-phase system. Suitable 3-phase power is supplied from a source 61 via lines 54 to the stators of the selsyn motors 32, 32b, 32c and 57, and of generator 58. Individual switches 55, 55b, 55c and 55d are provided in lines 54 for the respective motors, and a master switch 53, inserted in power line 61, controls the entire system. It is convenient to connect driving motor 59 to lines 54, as indicated, so that it is also under control of switch 53. Motor 59 is preferably of the slip ring synchronous type with its rotor windings shorted through a variable resistance (not shown) to provide convenient speed control, including a definite synchronous speed.

Each of switches 53, 55, 55b, 55c and 55d in practice comprises two separately operable switches, closure of one of which applies single phase voltage to bring the rotor of the associated motor into interlocked alinement with selsyn generator 58 before 3-phase voltage is applied by closing the second switch. For clarity of description the dual nature of those switches will generally not be explicitly noted.

In recording a sequence of camera motion, the three recording-repeating channels are first energized by closing switch 43, providing power over lines 41, 41b and 41c to the amplifiers and synchros. With switches 46, 46b and 46c in recording position (as in Fig. 1), this brings each recording arm 34 into a position corresponding to the associated camera position. The tapes 30, 30b and 30c are threaded over their drums and the starting point on each tape is preferably marked for convenient reference.

Film 64 is provided in camera 20. Switches 55, 55b, 55c and 55d are closed, interlocking the associated tape and camera drive motors, and switch 53 is closed, starting drive motor 59. That drives selsyn generator 58 and the tape and camera motors which are interlocked with it. Thus all motors are started simultaneously and operate synchronously, whatever the speed of main drive motor 59. The various coordinates of the camera motion, which is originally produced in any arbitrary manner such as by manual and mutually independent operation of hand wheels 50, 50b and 50c, are then recorded in their respective channels in a definite time relationship.

To reproduce the recorded motion, the record tapes 30, 30b and 30c are reset in their original positions on their drums, preferably with the aid of the starting marks, and switches 46, 46b and 46c are shifted to repeat position. The film 64 in the camera may be the same film previously exposed and undeveloped, reset to its original starting position; or may be a fresh film, depending upon the photographic operation involved. With the switches in lines 54 closed, switch 53 is closed, again simultaneously starting the camera and the various recording-repeating channels. The latter now operate in their repeating function and drive the camera through the same motions previously arbitrarily imposed.

It is sometimes useful to record first only one coordinate of camera motion, full attention of the operator being then available for the details of the motion desired (with or without actual exposure of the camera film). That channel can then be set to repeat, thus driving the camera motion in the first coordinate while camera motion in a second coordinate is introduced manually and recorded by its channel. Finally, motion in the third coordinate can be recorded while the camera automatically repeats the records from the first two channels. Thus a complete record of the desired motion in all three coordinates is produced without the necessity of handling and coordinating more than one manual control at a time. Illustrative procedures employing a recording-repeating system in composite photography are discussed below.

An illustrative embodiment of a camera mount 70 for carrying out the invention is shown somewhat schematically in Figs. 2–5 and 13. The particular embodiment illustrated is based upon an existing "nodal point" camera mount, designed to provide pan and tilt motions about axes 71 and 72, respectively, which intersect at the nodal point of the lens 73 of the camera 74 (Fig. 13). Advantages inherent in that location of the axes of camera rotation are discussed, for example, in U. S. Patent No. 1,971,486, issued on August 28, 1934, to H. G. Jennings, and apply with increased force in connection with the present invention. An important characteristic of such a mount is the fact that there is no spurious relative movement at the image plane between images of objects at different distances from the lens.

Camera mount 70 comprises a base 69, adapted by means not shown to be secured to a tripod or other support and having a vertical post 75; a frame casting 76 supported on post 75 and rotatable with respect to base 69 about vertical pan axis 71 on bearings indicated at 77 and 78; a cradle 80, having a pair of cylindrically curved rail surfaces 81, so slidably related to frame 76 as to allow relative rotation of the cradle about tilt axis 72 (Fig. 13); and a carriage 84, slidably mounted as by ways 85 on cradle 80 and adapted to carry the motion picture camera 74 with its optical axis 83 parallel to ways 85. Carriage 84 is adjustable along ways 85 by means shown as the rack 86 and the hand-wheel 87, geared to the rack by gear train 88, so that the nodal point of the camera lens can be set accurately to tilt axis 72 for a lens of any focal length and for any focal adjustment of the lens with respect to the camera.

Similar slides can be provided for vertical and lateral adjustment of the lens nodal point, but it is preferred to mount each camera, or each type of camera, on carriage 84 by means of an adapter plater, indicated schematically at 89, which is so designed as to properly position the camera laterally and vertically with respect to the axes of mount rotation 71 and 72.

The motion of cradle 80 with respect to frame 76 is guided by pairs of supporting rollers 90, 91, which are carried by shafts 92, 93, respectively, journaled in vertical plates 94, 95 of frame 76, and which engage rail surfaces 81 of the cradle; and by hold-down rollers 98, carried by the similarly journaled shaft 99, which engage an oppositely facing cylindrical surface 100, coaxial with rail surfaces 81 on the cradle. Rails 81, 100 are circularly curved about tilt axis 72. The cradle motion (tilt) is driven by a pair of pinions 110 rigidly mounted on shaft 111, journaled in frame 76, and which engage gear sectors 112, mounted on the cradle coaxially with rails 81 and 100. Pinion shaft 111 is driven alternatively manually by handwheel 113, which is shown mounted directly on the shaft, but can instead be linked to it by a suitable gear train; or by tilt servomotor M1 (corresponding functionally to motor 28 of Fig. 1). The shaft of motor M1 is linked to shaft 111 by a reduction gear train indicated at 115. Motor M1 is removably mounted on frame 76, with its shaft and pinion 116 projecting through a clearance hole 117 in the frame. Removal is utilized here as a simple equivalent of drivingly disconnecting the motor from the cradle (as by a disconnectible clutch) so that the motor inertia and friction are eliminated when the cradle is moved in tilt by manual or other operation.

The momentary tilt position of the camera mount is electrically indicated for control purposes by means of three tilt synchro generators, G1, G2 and G3, mounted on subframe 120 (Figs.

4 and 5). The rotor shafts of the generators are driven through suitable gearing from pinion shaft 111. As illustrated, G1 and G3 are connected together at a 1:1 speed ratio by gears 123 and 124; and G2 is connected to them at a 4:1 speed ratio by pinion 125 on its shaft meshing with gear 126 on the shaft G1. Gear 127 on the shaft of G2 meshes directly with gear 128 on pinion shaft 111. Universal connections 121 are indicated in the rotor shafts to insure free operation. The gears 127, 128 are preferably so proportioned that the full operation range of camera tilt motion about tilt axis 72 corresponds to approximately one revolution of G1 and of G3 and four revolutions of G2. Generators G1 and G2 are then available for a dual speed synchro system (see below) and correspond generally to synchro 29 (say) of Fig. 1; and G3 is available as an auxiliary one speed synchro, for use, for example, with a remote hand wheel. Electrical connections from the three generators are omitted for clarity from Figs. 2–5, but are illustratively shown in Fig. 10 and described below.

The pan motion of frame 76 and of the structure supported thereon is driven with respect to base 69 through a base drive gear 135, fixed on base column 75. A manual drive is provided, comprising a pan handwheel 136 mounted on frame 76 and connected as by spiral gears 137 to a jack shaft 138 journaled on frame 76 and carrying gear 139 which meshes directly with base drive gear 135. Rotation of handwheel 136 causes gear 139 to walk around fixed gear 135, carrying frame 76 and the camera with it. A power drive is also provided, comprising pan servomotor M1b (corresponding to motor 28b, say, of Fig. 1) which is detachably mounted on frame 76 with its shaft and pinion 140 projecting through a clearance hole 141 and connected to pan drive gear 135 by a reduction gear train indicated at 142.

The pan position of the camera mount is electrically indicated for control purposes by a set of three synchro generators G1b, G2b and G3b, which are mounted on subframe 145, are driven by gearing 144, and perform with respect to the pan motion the same functions which generators G1, G2 and G3 perform for the tilt motion. Generators G1b and G3b are connected together at a 1:1 speed ratio by gears 146 and 147, and are driven by gear 148 which meshes directly with, and is the same size as, a pan control gear 149, fixed on base column 75. Generator G2b is driven directly from fixed gear 149 by a gear 150 whose pitch diameter is one quarter that of gear 149. Thus generator G2b makes four revolutions, and generators G1b and G3b make one revolution each, for every 360° of camera pan motion. Pan generators G1b, G2b and G3b are electrically connected to a pan control channel in the same manner that tilt generators G1, G2 and G3 are connected to the tilt control channel, as shown in Fig. 10 and described below.

Camera mount 70 can be operated manually, like an ordinary nodal point camera mount, by manipulation of hand wheels 113 and 136. Manual operation can also be handled from a distant location by making use of the servocontrol system, to be described below, and manipulating handwheels associated with that system. Mount 70 is also adapted to be used in conjunction with a recording-repeating mechanism, so that any arbitrary pan and tilt motions can be recorded, and then repeated immediately or at any later time.

Translational camera motion although not specifically included in the illustrative embodiment of Figs. 2–5, can be provided, for example, as shown schematically in Fig. 1, or as shown in a more detailed embodiment in connection with Fig. 13 (see below).

Figs. 6–9 illustrate a preferred form of a recording repeating mechanism 174, including two channels. Additional channels can be provided as required, for example by duplicating one or both of those shown. Central supporting frame and gear box 180 is mounted on a firm base 181 (which may also support additional units) and carries the various elements of the two recording-repeating mechanisms symmetrically arranged on its opposite faces. The elements of one channel (A) are shown in Fig. 6 mounted on the front face of frame 180. Directly behind each of those elements is the corresponding element of the other channel (B), mounted on the rear face of frame 180. The mechanisms of the two channels are duplicates and will be described by reference to some parts of one and other parts of the other, as conveniently shown in the drawings. Fig. 7 is an end elevation, partially broken away, showing elements of channel A to the left and elements of channel B to the right of frame 180. Unnecessary duplication of drawings is avoided in Fig. 7 by breaking away the two channels at different section lines, those lines being indicated in Fig. 6.

Each recording-repeating channel comprises a tape moving mechanism 175, adapted to move a record tape past the recording or repeating tool, and a recording-repeating head 176 adapted for supporting that tool in engagement with the tape, and for moving the tool transversely of the tape.

The machine illustrated is adapted to use conventional perforated motion picture film as record tape. The film 184 is loaded on a supply reel 185, from which it is drawn by a sprocket 186. (For clarity of illustration the film is omitted in channel A of Fig. 7.) That sprocket is mounted on sprocket shaft 189 which is journaled in frame 180 and driven by the selsyn or synchronous motor 187 through a suitable gear train, indicated at 188. Sprocket shaft 189 is common to both the mechanisms A and B; so that both are driven together from the single motor 187, which may thus be considered to correspond to the two motors 32 and 32b (say) of Fig. 1. From sprocket 186 film 184 passes over and drives a freely revoluble drum 190, and returns to the sprocket. Drum 190, turning on a stub shaft 194 fixed in frame 180, supports the moving film in a position which is accurately maintained in both coordinates transverse to the film motion, that is, both radially and axially with respect to the drum. Radial disk 191 is mounted on one face of drum 190 and is urged by springs 192 against one film edge, pressing the other film edge into uniform contact with guiding peripheral flange 193 at the opposite drum face. The film is guided by suitably placed freely revoluble rollers 196, and is maintained in firm contact with the periphery of drum 190 by a tension roller 197. Roller 197 is mounted on a lever 198, centrally pivoted at 199, and is adjustably urged against the film by tension spring 200 which acts on the opposite end of lever 198 and is adjustable by thumb screw 201. Film perforations 205 are brought into mesh with sprocket teeth 206 by conventional sprocket clamps, shown schematically at 207 and 208 in Fig. 6 only. Film 184 is finally rewound on takeup reel 210, which is driven from sprocket shaft 189 through a torque limiting slip clutch, indicated schematically at 211 in Fig. 6, and a chain and sprocket drive 212.

Motor 187 is preferably of the 3-phase lock-in type which is customarily used for driving motion picture cameras and associated mechanism, and which gives accurately synchronized operation of such mechanisms. By suitable design of gear train 188, record film 184 will then be driven at the same speed as the photographic film in the associated camera, facilitating correlation between the resulting record of camera motion and the film taken by the camera during that motion. As illustrated, a single motor 187 is physically connected, by means of shaft 189, to the film sprockets of two channels. Additional channels can be similarly drivingly connected to the same motor 187, or alternatively, separate motors can be provided for some or all of the channels, as indicated at 32, 32b, etc., in Fig. 1, electrical synchronizing means being then preferably provided.

Recording-repeating head 176 is constructed as a unit which is so mounted on frame 180 as to be located with high accuracy and yet readily demountable. Head case 215 is pivoted on stub shaft 216 by means of a bracket 217, which is axially confined on the shaft by spring retainer 218. Shaft 216 is rigidly mounted in a bore in frame 180 by set screws 219, and projects on opposite sides of the frame to support the heads 176 of both channels A and B. Head case 215 is preferably adjustably mounted on bracket 217 for convenient variation of the overhang of the head. As illustrated, inwardly directed flanges 220 on the two arms of bracket 217 slide in grooves 221 in the sides of head case 215, set screws 222 being tightened on the flanges to lock the head in adjusted position. An adjustable counter-balance is preferably provided, as indicated by the threaded stud 223 projecting from the rear end of case 215 and carrying a balancing weight 224.

A recording or a repeating tool 225, according to the process to be carried out, is mounted by means of a thumb screw 226 (Fig. 8) at the free end of an arm 227, which is rigidly clamped to vertical shaft 230, journaled in case 215. Tool 225 is located adjacent the peripheral surface of film drum 190 on a radius parallel to the axis of shaft 230, and is movable, by swinging of arm 227 about that axis, transversely across the drum surface and hence across a film 184 running over the drum. If for any reason (see below) arm 227 is replaced by an arm of different length, the correct location of tool 225 with respect to drum 190 can be maintained by suitable adjustment of the entire head 215 with respect to bracket 217 as described above. Shaft 230 carries a gear 231 which meshes with pinion 232 on shaft 233. That shaft carries gear 236 which meshes in turn with pinion 237, mounted with gear 239 on shaft 238. Finally, gear 239 is engageable by pinion 240, mounted on output shaft 241 of a reduction gearing indicated at 242 driven by servomotor M2 (which corresponds to motor 38 of Fig. 1). The motor is so mounted in sleeve 245 that shaft 241 and pinion 240 are eccentric with respect to the sleeve. Rotation of the mounting sleeve in case 215 about an axis parallel to shaft 238 brings pinion 240 selectively into and out of mesh with gear 239. A detent device 246 is preferably provided to define two suitable rotational positions of sleeve 245, at which the gears are respectively in and out of mesh, and a which motor M2 is accordingly drivingly connected to and disconnected from arm 227. The gear ratio by which servomotor M2 is linked to shaft 230 and hence to arm 227 depends primarily upon the speed and torque characteristics of the motor and the maximum anticipated rate of arm movement.

Two synchro transformers T1 and T2 are mounted on the upper face of case 215 with their rotor shafts 252 and 253 respectively coaxial with shafts 233 and 238 and linked thereto by universal couplings indicated schematically at 254 and 255. The ratio of gear 231 and pinion 232 is such that the swinging of arm 227 through the angle required to carry tool 225 across the useable portion of film 184 accompanies rotation of shaft 233 through approximately one revolution. The ratio of gear 236 and pinion 237 is such that shaft 238 rotates four times as fast as shaft 233. Thus synchros T1 and T2 are available for use in a dual speed synchro system, and together correspond to synchro transformer 36 of Fig. 1.

The entire recording-repeating head 176 may be allowed to swing freely about its supporting shaft 216, being so balanced as by adjustable counterbalance 224, that gravity tends to swing it counterclockwise (as seen in Fig. 6) with such a torque as to produce the desired downward force of tool 225 against the surface of record film 184. For recording, tool 225 is preferably a cutting point of the type ordinarily used for cutting sound records in phonographic recording, and a working force of a few ounces is found to be satisfactory. For following a previously cut record groove, such as is indicated at 228 in Fig. 9, a sapphire phonograph needle is preferably used, and that also operates satisfactorily with a force of a few ounces.

Alternatively, contact between the recording or repeating tool 225 and film 184 may be positively established by anchoring head 176 at a suitable rotational position about shaft 216. Such a positive anchor is preferably used during recording to insure a record groove of uniform depth; and the head is preferably allowed to float, as described in the preceding paragraph, during repeating. This is accomplished in the present instrument by a spring latch 260, which is mounted on stud 261 on frame 180 and may be swung about that stud into inoperative position, indicated by dot-dash lines in Fig. 6, when head 176 is to be operated under gravity, as just described. When latch 260 is in operating position, as shown in solid lines in the drawings, the slot 259 at the end of finger 265, extending rigidly from head case 215, receives vertical rod 262 of the latch assembly (the length of the slot accommodating longitudinal adjustment of case 215 on bracket 217). Rod 262 is threadedly mounted, as indicated at 268, in latch base 263 and carries a defining flange 264 adapted to engage and support the lower surface of finger 265 at a level which is adjustable by screwing rod 262 into or out of base 263. A lock nut 264a is provided to lock rod 262 in its adjusted position. Cap 266 is carried by the upper end of rod 262 and is urged downwardly on the rod by compression spring 267 against the upper surface of finger 265, thus normally urging that finger into engagement with defining flange 264. That engagement is yieldable by compression of spring 267, but is positive, so fas as normal action of recording or repeating tool 225 is concerned, if the spring is relatively stiff. The level of tool 225 with respect to record film 184 is then determined by the adjustable level of flange 264. Lift lever 270 is pivoted at 271 on the side of latch base 263, and has a camming surface 272 which is so formed that, when the lift lever is rotated clockwise as seen in Fig. 7 (or counterclockwise as seen in Fig. 8A), cam surface 272 engages finger 265 and lifts and supports it, compressing spring 267. Tool 225 is thus raised from its operating position free of drum 190 and record film 184.

Fig. 10 illustrates schematically a preferred arrangement of electrical circuitry for combined operation of the recording-repeating unit 174 of Figs. 6–9 with the camera mount 70 of Figs. 2–5. Provision is also shown for connecting other apparatus in place of the camera mount (see below). For the sake of clarity, only one channel of the control system, controlling for example, the tilt motion of the camera and utilizing one channel of dual recording-repeating unit 174, is included in Fig. 10. It is understood that a complete control system ordinarily includes one or more additional channels of similar or identical design, controlling motion in whatever other coordinates may be involved in a particular setup. Such a combination of channels operating in association is illustrated functionally in Fig. 1.

One-speed synchro generators G1 and G3 and four-speed generator G2, the mechanical mounting and motion of which have already been described (Figs. 4 and 5), are electrically connected as illustrated in Fig. 10. The rotors 4 of all three synchro generators are connected in parallel via lines 301 and 302 to a suitable source of alternating current, typically shown as 26 volts, 400 cycles. The three stator windings of one- and 4-speed generators G1 and G2 are connected respectively by lines 303 and 304 to the corresponding windings of one- and 4-speed synchro transformers T1 and T2, which are mounted as already described on recording-repeating head 176. The three stator windings of generator G3 are connected via lines 305 to contacts 1, 2 and 3, respectively, of an electrical connector S1, by means of which a synchro transformer T3, driven by a hand wheel 330 or other control device, can be connected for the purpose of controlling the camera motion while a record of the motion is made (see below). Such a control then replaces the hand wheel on the camera mount, and has the advantage that it can be operated remotely.

If the position of the rotor of synchro transformer T1 does not correspond to that of generator G1, an A. C. error signal is generated in rotor 4 of T1, the phase of the signal corresponding to the sign of the error; similarly, an error signal is generated in the rotor of 4-speed synchro transformer T2 whenever its position does not correspond to that of 4-speed generator G2. For small errors the error signal from 4-speed transformer T2 is about four times as large as that from one-speed transformer T1, and use of the 4-speed signal in the servo system leads to correspondingly greater accuracy. On the other hand, when the error is large the phase position of the rotor in the 4-speed transformer does not necessarily represent correctly the phase sector of the error. Under such conditions (and also when apparatus not equipped with a 4-speed servo is used with the recorder-repeater, as will be described) control is switched from the 4-speed to the one-speed synchros. Such switching is accomplished automatically in the present system by voltage sensitive relay H whenever the error exceeds some predetermined value less than that at which the mount will shift phase sector; and can also be accomplished manually when desired by shifting speed switch E.

The individual switch arms and terminals of each switch in the present system are designated by numerals written as suffixes to the letter by which the switch itself is designated. However, for clarity in the drawings only the numerals are shown for the arms and terminals, the switch letter being written once for each switch assembly.

When speed switch E is at dual speed position (as shown) and relay H is deenergized (as shown) the error signal from the rotor of 4-speed synchro transformer T2 is transmitted via lines 310 to relay switch terminals H2 and H5, through switch arms H1 and H4, via lines 311 to switch terminals E8 and E11, and through switch arms E7 and E10 to lines 312. The one-speed error signal from transformer T1 is transmitted via lines 315 to switch arms E1 and E4, through those switch arms to terminals E2 and E5 and via lines 316 to relay switch terminals H3 and H6, which are open. Lines 316 are also connected across the relay coil H7 of A. C. voltage sensitive relay H. Hence when the one-speed error signal exceeds the value at which relay H responds, the relay is actuated. That opens the 4-speed error circuit at relay switch terminals H2 and H5, and connects instead the one-speed error signal, which is then transmitted from terminals H3 and H6 through relay H, lines 311 and switch arms E7 and E10 to lines 312. As soon as the one speed error signal has been sufficiently reduced, for example by action of the servo system, relay H is again deenergized and drops to its 4-speed position, again connecting the 4-speed error signal to lines 312 by the circuits already described.

If switch E is shifted manually to single speed position, switch arms E7 and E10 open the described connection of lines 312 to relay H and connect them instead via switch terminals E9 and E12 and jumpers 318 to switch terminals E3 and E6. The shifting of switch arms E1 and E4 opens the described connection between one-speed transformer T1 and relay H, thus removing the small load that relay coil H7 imposed upon the transformer; and connects the transformer T1 instead to switch terminals E3 and E6, and hence to lines 312. Thus switch E in "single" position takes control completely away from relay H, disconnects the relay coil H7 and connects the one-speed error signal to lines 312.

The primary function of record-repeat switch F is to deliver the error signal from lines 312, connected to switch terminals F1 and F4, selectively to recording servo amplifier 320 during recording (via switch arms F1 and F4 and lines 321); or to the camera servo amplifier 322, which controls the camera position, during repeating. Amplifiers 320 and 322 are phase sensitive, receiving power via lines 323 from a suitable A. C. source which is in phase and preferably identical with that supplying lines 301 and 302. Lines 325 from the input of camera servo amplifier 322 may, under certain conditions, lead directly to switch contacts F3 and F6 (in contrast to the arrangement of Fig. 10), and in that case shifting of switch F to repeat position will deliver the synchro error signal from lines 312 through switch arms F1 and F4 directly to lines 325 and hence to camera amplifier 322.

Amplifier 322 corresponds generally to repeating amplifier 48 of Fig. 1, but performs also a second function. It is convenient when recording the camera position and hence when the synchro error signal in lines 312 is being delivered to recording amplifier 320 and thus controls the position of the recording tool, to provide automatically some external control signal to the input of camera servo amplifier 322. That signal (coming in the present instance from hand wheel synchro transformer T3) may then be used to control, or in effect to drive, the camera motion, either from a location remote from the camera, or directly from the camera but without the necessity of providing manually the actual driving torque. (Alternatively, the camera motion may be driven by a conventional hand-wheel mechanically linked to the gear train of the camera drive as already described.) Means are also provided, including switch J and switch arms F13 and F16 of switch F, for connecting in place of camera servo amplifier 322 the corresponding element of other apparatus, which may be of another type. The detailed functioning of switch J and of switch arms F13 and F16 of record-repeat switch F, which are associated with connector S3, will be described later. When the camera is to be controlled (for recording or repeating) through camera amplifier 322, switch J is kept in camera position, as shown.

With the arrangement illustrated, lines 325 from the input of camera amplifier 322 connect through switch J in its camera position and via lines 326 to switch arms F7 and F10 of record-repeat switch F. When that switch is in record position, as shown, the switch arms F7 and F10 connect through terminals F8 and F11 and lines 327 to contacts 4 and 5 of connector S1 and through the mating connector S2 to the rotor 4 of hand wheel synchro transformer T3. The error signal from T3 is thus delivered to amplifier 322 and controls camera servomotor M1 (see below), causing the camera mount to follow whatever motion is fed to synchro T3 by hand wheel 330.

When switch F is shifted to repeat position, the described circuit from the rotor of synchro T3 to camera amplifier 322 is opened at switch terminals F8 and F11, and the amplifier is connected instead via terminals F9 and F12, jumpers 332, switch terminals F3 and F6, and switch arms F1 and F4 to lines 312, and thence by the circuits already described to the rotor of one or other of synchros T1 and T2 on recording-repeating head 176. Camera servomotor M1 causes the camera to follow the motion of arm 227, which is guided by whatever record film 184 is in the machine 174. The input circuit to recording servo amplifier 320 is opened at switch terminals F2 and F5 during the repeating cycle, and servomotor M2 in recording-repeating head 176 is preferably disconnected from arm 227 in the manner already described (Fig. 8).

Camera servo amplifier 322 may be so constructed as to drive directly a suitable servomotor M1 on the camera mount. However, in the illustrative embodiment of Fig. 10 further amplification of a non-electronic type is provided by an amplidyne generator, shown schematically at 330. The output from amplifier 322 is transmitted via lines 331 to the field coils 332 of generator 333, which is driven continuously by a motor 334. One generator armature winding is short circuited, as indicated, and carries a relatively large current which induces in a second winding a voltage approximately proportional to the controlling current in field coils 332. That voltage, after commutation is applied as a direct current voltage via lines 337 to the armature of D. C. servomotor M1. The field of motor M1 is excited via lines 338 by an outside source of direct current, which may also power amplidyne motor 334 as illustrated. The lines 337 are tapped via lines 340 to feed the amplidyne output voltage back to servo amplifier 322, where it is applied in the usual way as feed back to obtain improved operating characteristics of the system as a whole.

In summary of Fig. 10, servomotor M1 applies to the camera mount a torque of appropriate sign and magnitude to reduce any position error that exists between the synchro transformer T1, T2 or T3 (whichever is connected by the described switch system to servo amplifier 322) and the corresponding synchro generator G1, G2 or G3 on the camera mount. The camera motion therefore substantially duplicates that of the controlling synchro transformer. That controlling transformer during a recording cycle is typically hand wheel synchro T3; and during a repeating cycle is one or other of recording-repeating head synchros T1 and T2, depending upon the size of the position error (which controls relay switch H) and upon the position of switch E. Thus during recording, with switch F at "record," the camera motion follows hand wheel synchro T3 or its equivalent and arm 227 on the recording head follows the camera motion. During repeating, with switch F at "repeat," arm 227 follows the previously prepared record groove 228, and the camera motion follows arm 227.

During normal operation of the record-repeat unit with the camera mount here described, or with any mechanism similarly equipped with both one- and 4-speed synchros, greater accuracy is ordinarily achieved with switch E at "dual," as illustrated, so that the system operates normally on the 4-speed synchros. The error signal ordinarily is large enough to actuate relay H only when the system is first connected or is under some abnormal condition. Under such conditions, it may be convenient to throw switch E to "single," and that is done also when the record-repeat device is to be used with apparatus having only a one-speed synchro system (see below).

The apparatus shown in Fig. 10 represents a typical embodiment of circuitry associated with one channel of a recording-repeating system, adapted to handle camera motion in one coordinate. By duplicating such equipment to any required extent, additional components of camera motion can be handled in the same manner, one channel preferably being available for each component.

The apparatus already described, including the camera mount 70 of Figs. 2-5 and the recorder-repeater 174 of Figs. 6-10, illustrates one manner of controlling and repeating camera-subject motion, namely by moving the camera with relation to its support and by recording and repeating that motion. Under certain conditions it is preferable to obtain the camera-subject motion by moving the subject as a whole and holding the camera fixed. Figs. 11–13 illustrate schematically a preferred illustrative manner of producing such motion of the subject, the subject itself being typically shown as the easel 360 (Fig. 12) on which a painting, photograph and the like can be mounted and photographed by a camera 361. Easel 360 can be replaced by a three dimensional subject, for example a miniature model of a scene, and is to be considered as a schematic representation of any type of movable subject. The camera is shown mounted on a rigid stand 362 on the floor 364, and having its lens axis 363 horizontal, but may be movably supported, as on a mount such as 70 in Figs. 2–5.

As illustrated, easel 360 is capable of independent motions of translation along three rectangular coordinates, which will be designated respectively as transverse (of camera axis), vertical and longitudinal (along camera axis). The easel proper is suspended by a rigid frame 365, which may itself be adjustable, from an assembly 366 of carriages which are relatively movable in translation. Frame 365 is directly connected to transverse carriage 370, which is mounted as by rollers 371 for free translation with respect to a second or vertical carriage 374 in a horizontal direction parallel to the easel surface and normal to the axis 363 of the camera lens as illustrated. Vertical carriage 374 is vertically movable in translation, guided as by rollers 375 with respect to main carriage 378, and carries transverse carriage 370 and easel 360 along with it in that motion. The total weight of carriages 374 and 370 is preferably approximately balanced, as by a counterbalance 376 connected to carriage 374 by cable 377, which passes over pulleys 379 mounted on main carriage 378. Finally, main carriage 378 is supported on one or more fixed overhead beams 380 by rollers 381, which permit longitudinal motion of the three carriages as a unit in a direction parallel to lens axis 363.

While the illustrated suspension of easel 360 from overhead beams has been found very convenient, a similar result can be obtained by a system of carriages supported in other ways. It is to be understood that the three motions of translation illustrated can be replaced or supplemented to any desired extent by other types of motion, including rotation or curved lines of motion about any selected centers, the present easel support with controlled motion in three rectangular coordinates being illustrative.

A typical form of power drive is illustrated for driving each of the easel motions. This will be described in detail as applied to the longitudinal motion of main carriage 378, the other two motions being driven in a similar manner. An effectively endless cable 385 passes over two idler pulleys 386, main carriage 378 being connected to one pass of the cable as at 387. Cable 385 also passes around a driving drum 388 which is fixed with gear 389 on a shaft 390, journaled in a suitable fixed mounting plate 391. A hydraulic motor 394, also mounted on plate 391, is drivingly coupled to gear 389 by a gear train designated generally by the numeral 398. Thus rotation of motor 394 moves cable 385 over pulleys 386 and draws carriage 378 along beam 380 in one direction or the other. Hydraulic motor 394 preferably comprises what is commonly known as the B-end of a hydraulic torque amplifier of a type which is available commercially. The overall function of the hydraulic torque amplifier is to translate a relatively small D. C. electrical control signal, applied via cable 405, into the relatively large torque output of hydraulic motor 394, the direction and magnitude of that torque being controlled by the sign and voltage of the control signal. Hydraulic motor 394 is driven by fluid circulated through lines 408 and 409 from a constantly driven hydraulic pump, or A-end, 407, the output of which is variable as to both rate and direction of flow and is controlled via a hydraulic preamplifying mechanism 406 in response to the electrical control signal from cable 405. That control signal may be obtained in any suitable manner, but is supplied in the present preferred embodiment of the invention as the output from an electronic hydraulic unit amplifier 415 (Fig. 11), the input signal to that amplifier being produced as will be described. The longitudinal drive system, as so far described, may be considered as an illustrative means of driving the relatively heavy load of carriage 378 in one direction or the other in response to a positive or negative direct current signal of relatively low amplitude, supplied as output voltage from amplifier 415.

A pair of synchro generators G7 and G8 are mounted on plate 391 (G8 being directly behind G7 in Fig. 12) with their rotors driven together as by gear 416 which meshes with the gear train 398 through which cable drum 388 is driven. Generators G7 and G8 are thus driven in rotation in accordance with any motion in translation of carriage 378, and have a definite rotational position corresponding to every translational position of the carriage. The overall gear ratio between gear 389 and synchros G7 and G8 is preferably such that motion of carriage 378 throughout its available range of longitudinal motion corresponds to somewhat less than one complete rotation of the synchros.

The preceding description of the operating mechanism for the longitudinal motion of carriage 378 is applicable also to the vertical operating mechanism of carriage 374 and to the transverse operating mechanism of carriage 370, shown in Fig. 12, provided certain modifications are made, including obvious changes in terminology corresponding to the superficial structural differences, addition of suffixes -b and -c respectively to identifying numerals, and substitution of G9, G10 and G11, G12 respectively for G7, G8. Motion in each of the three coordinates is thus under control of an electrical voltage, supplied, by means to be described, to the corresponding hydraulic preamplifier 406, 406b or 406c via cable 405, 405b or 405c. And the momentary positions of the carriages, and hence of easel 360, in each of the three coordinates is represented or indicated by the rotary positions of a corresponding pair of synchro generators, G7, G8; G9, G10; or G11, G12.

Electrical control apparatus for conveniently providing and controlling the voltage to be supplied to hydraulic preamplifiers 406, 406b and 406c to produce the desired components of motion of easel 360 is illustrated in Fig. 11. That figure shows only one channel of the control apparatus, namely, that controlling longitudinal easel motion, it being understood that other similar or identical channels are to be provided, as indicated in Fig. 1. The apparatus of Fig. 11, with the exception of the parts already described and shown in Fig. 12, is preferably mounted in a cabinet or control console, such as is illustrated at 430 (Fig. 12), with the various dials, switches, etc., to be described, arranged on one of the three panels of that console, say 431. Panels 431b and 431c similarly accommodate the corresponding controls associated with the other two control channels.

An important feature of the easel control system of Figs. 11 and 12 is the provision in control console 430 of an indicator and control element associated with each component of easel motion, and representing by its position the position of the easel in the associated coordinate. The longitudinal motion indicator and control element comprises the shaft 434 (Fig. 11), which carries directly position dial 436 and is preferably linked as by a suitable gear train indicated schematically at 434, to vernier dial 437, the latter rotating preferably ten times as fast as dial 436. Suitable scales 436a and 437a are carried by dials 436 and 437, respectively, to indicate to the operator the momentary longitudinal position of easel 360. Indicator shaft 435 is linked to the longitudinal easel motion, in the present preferred form of the invention, by an indicator servo system. That servo system includes synchro generator G7, linked as already described to the longitudinal motion of carriage assembly 366 along beam 380; synchro transformer T7, mounted in console 430 and connected to shaft 435 for rotation therewith; servomotor M4, drivingly connected to shaft 435; and servo amplifier 440. The three stator windings of generator G7 are electrically connected by lines 441 to the corresponding stator windings of transformer T7. The rotors 4 of generators G7 and G8 are connected in parallel by lines 442 to a source of alternating current, shown typically as 26 volts, 440 cycles. The rotor of transformer T7 is connected via lines 444 to relay switch arms K4 and K7, and through those arms either to contacts K5 and K8, when relay K is deenergized as shown, or to contacts K6 and K9, when relay K is energized as during normal operation (see below). The latter contacts, K6 and K9, are connected via lines 445 to the input of servo amplifier 440, in which the error signal from T7 is amplified and rectified with phase discrimination. The amplifier output is supplied over lines 446 to the field coils of servomotor M4. When relay K is energized, the error signal from the rotor of generator T7, which is zero only if the rotational position of shaft 435 corresponds to the momentary longitudinal position of easel 360, is supplied to amplifier 440, and after amplification and phase sensitive rectification drives motor M4 in such a direction as to reduce the error signal. Thus shaft 435 in effect follows the longitudinal position of the easel, maintaining the one to one correspondence defined by zero error signal. Dials 436 and 437 are calibrated in accordance with that correspondence. Shaft 435, like generators G7 and G8 makes less than a completes revolution for the full range of easel movement.

The control function of shaft 435 in the present embodiment of the invention is performed by actuation of switches U and V at independently predetermined rotational position of the shaft. That actuation is typically accomplished, through physical connections that are indicated by dashed lines in Fig. 11, by cams 450 and 451 respectively, mounted on cam arms 452 and 453 which are frictionally mounted on shaft 435 for independent rotational adjustment with respect to the shaft. Adjustment of cams 450 and 451 is facilitated by providing on cam arms 452 and 453 scales or pointers such as are indicated at 454 and 455, by which the position of switch actuation can be read with relation to dial 436, and hence with relation to the longitudinal position of easel 360. Switches U and V are shown in Fig. 11 in their normal, or unactuated, positions. As each cam 450, 451 approaches its predetermined rotational actuating position it shifts the associated switch to the right in the drawing into actuated position; and upon reversal allows the switch to drop back to normal position.

In general, switch U acts as a limit switch, the setting of its actuating cam 450 determining the point of the motion of easel 360 inward toward camera 361 at which the eased motion is automatically either stopped or reversed, selection of one or other of these actions being determined by the position of switch R. Similarly, switch V acts as a limit switch on the outward motion of the easel, the setting of its cam 451 determining the position at which outward easel motion is either stopped or automatically reversed. In addition to the automatic stopping or reversing action just indicated, the system can be started or stopped manually by means of switch Q, or by closing or opening master switch P, which controls simultaneously the longitudinal channel and also the other two channels of the easel motion. Momentary operation of push button switch N, either prior to starting of the system by switch Q or P, or while the system is running, manually controls the direction of easel motion, that direction being in if "in" button N1 is pressed and out if "out" button N4 is pressed, independently of the previous running direction. Thus switch N serves both as a manual reversing switch and as a means for predetermining direction before operation of starting switch Q or P. The detailed circuitry by which the described functions are carried out will be described presently.

The rate and direction of longitudinal motion of easel 360 is determined as already stated, by the sign and magnitude, respectively, of the output voltage supplied from hydraulic unit amplifier 415 to solenoid 404 in pre-amplifier 406. According to the present invention, that speed controlling amplifier output from 415 is determined in voltage and sign by the amplitude and phase of an alternating input voltage supplied to phase sensitive amplifier 415 over lines 460, 461 and generated in speed voltage generator unit 462. The latter operates on the same basic principle as the error signal generator ordinarily used in a servo system, for example synchro generator G7 and synchro transformer T7. The overall function of speed generator unit 462 is to supply the phase-sensitive rectifying amplifier 415 with either of two alternating current signals which are mutually 180° out of phase and whose amplitude is manually adjustable. Amplifier 415, phase sensitive and rectifying, then translates the received signal into an amplified direct current voltage of a sign dependent on which signal is supplied, and of a voltage dependent on the manually controlled amplitude of that signal.

In Fig. 11 the apparatus of generator unit 462 is diagrammatically enclosed by the broken enclosure line designated 462. The rotor of a synchro generator G13 is locked in a definite rotational position, and is supplied with alternating current over lines 465 from the same source as that which supplies alternating current via lines 442 to hydraulic unit amplifier 415. The stator coils of generator G13 are connected via lines 466 to the corresponding coils of synchro transformer T14, and also to the stator coils of transformer T13 in transposed arrangement as indicated in Fig. 11. The rotors of transformers T13 and T14 are mechanically linked, as indicated by dashed lines, to dials 470 and 471 respectively, by which their rotational positions can be manually adjusted, and on which suitably calibrated scales are preferably provided to indicate the rate of easel travel corresponding to various dial settings. Alternating current signals are generated in the set rotors of transformers T13 and T14, corresponding in amplitude to the difference between the respective rotor positions and the positions which would correspond to the fixed position of the rotor of generator G13. Since the stator windings of transformer T13 are transposed with respect to T14, the phase of the signals from the two transformers for an angular deflection of given sign will differ by 180°. Hence the output voltages from amplifier 415, corresponding to the signals from the two transformers, will normally be of opposite sign, and will drive easel 360 in opposite directions, the speed of easel travel in the two directions being directly controllable by the respective settings of dials 470 and 471.

One or other of the signals from the rotors of transformers T13 and T14 is delivered selectively to the input leads 460, 461 of amplifier 415, depending upon the condition of relay switch L. Line 472, with its various branches, connects one terminal of each transformer rotor to switch terminal K8, to terminal 7 of connector S4, and also to switch terminal W5 which is normally connected by switch arm W4 to amplifier input line 461. (The function of switch W will be described below in connection with connector S4, with which it is associated. Under certain conditions, for example when connector S4 is not required, switch W may be omitted, amplifier input lines 460 and 461 being connected directly to lines 478 and 472, respectively.) The other terminals of the rotors of transformers G13 and G14 are connected, respectively, via line 473 to relay switch terminal L3, and via line 474 to terminal L2. Switch arm L1 makes contact with L2 when the relay is deenergized, as shown, and with L3 when the relay is energized, thus connecting one or other of the two rotors selectively via line 475 to relay switch arm K1. When relay K is energized, switch arm K1 connects via terminal K3 to line 478 and thereby to terminal 6 of connector S4 and also to switch contact W2, which is normally connected via switch arm W1 to amplifier input 460.

When relay K is deenergized as shown, the circuit just described is opened at relay terminal K3, so that the speed controlling signals from the rotors of transformers T13 and T14 are not utilized. Instead, the input to amplifier 415 is supplied from the rotor of indicator and control transformer T7 via lines 444 to relay switch arms K4 and K7, through those switch arms to lines 478 and 472 respectively, and thence through the two arms of switch W, in its normal position, to input leads 460 and 461.

The effect of supplying amplifier 415 with a signal from transformer T7 is to confine the easel mount, so far as its longitudinal motion is concerned, in the position corresponding to the momentary position of synchro transformer T7 and of shaft 435 which is linked to it. The latter position remains fixed, once relay K is deenergized, since the input to servo amplifier 440 from transformer T7 is thereby opened at relay switch terminals K6 and K9, and the amplifier is so balanced that the output to motor M4 is then insufficient to drive it. But, as already explained, transformer T7 during normal operation (relay K energized) is driven by motor M4 through servo amplifier 440 in such a way that its position always corresponds to the longitudinal position of the easel. Hence the result of transferring control of hydraulic unit amplifier 415 from speed control synchro T13 or T14 to synchro T7, as when relay K is deenergized, is to lock or stow the easel system in its momentary (longitudinal) position. Energization of relay K, on the other hand, puts the easel under control of either the "in" speed control voltage generated by synchro transformer T13, or the "out" voltage generated by T14. Relay L determines which of those voltages takes control, and hence in general whether the easel moves in or out.

Relays K and L are controlled by switch means which, in the present illustrative embodiment, include manual switches N, P, Q, and R, and cam actuated switches U and V. One side of a power source, which is here illustrated as 115 volts, 60 cycles, but may be any suitable source of direct or alternating current, is connected via line 480 to terminals K10 and L10, on one side of the coils of relays K and L, respectively. The other side of the power source is connected via line 481 and its branches to switch terminal N2, to switch arm L4, to switch arm R1 and to switch arm V4. The relay energizing circuit of relay K extends from its other coil terminal K11 via line 483 to switch arm P1 of master switch P, and, when that switch is shifted to on position, through terminal P2 and lines 484 and 485 respectively to switch arm Q1 and terminal Q5. Thence connection may be completed to line 486 either via switch terminal Q3 by shifting switch arm Q1 to start position, or through terminal Q6 by momentarily pressing push button Q4 to closed position. From line 486 the circuit is completed through switch terminal R2 and switch arm R1 to power line 481 when switch R is in automatic reverse position as shown. Under that condition, relay K is energized by closing both master switch P and either the toggle Q1 or push button Q4 of panel switch Q; and is deenergized only by opening the master or panel switch.

When switch R is shifted to automatic stop position, the circuit just described is opened at terminal R2. The energizing circuit of relay K then leads from line 486 through switches V and U in series, passing through switch arm V1 to line 487 and thence through switch arm U1 and via line 488 to switch terminal R3, which is now connected by switch arm R1 to power line 481. Thus the relay K is now deenergized not only by opening switch P or Q, but also by cam actuation of either switch U (which is set to occur at the desired limit of easel motion away from the camera) or switch V (which is set to occur at the desired limit of easel motion toward the camera). In either instance, or if the circuit is opened at switch P or Q, deenergization of relay K stows the mount in the sense already described.

The energization of relay L is independent of switches P and Q. It is generally controllable by momentary actuation of either the "in" or the "out" button of switch N, and when switch R is in automatic reverse position it is also controllable by cam actuation of switch U or V. If relay L is deenergized, it can be energized manually by pressing "in" button N1, thus completing an initial energizing circuit from relay coil terminal L11 via line 490, across normally connected switch contacts N6 and N5, and through depressed switch bar N1 to power line 481. When switch R is in automatic reverse position, relay L is energized also at the set outer limit of easel motion by cam actuation of switch U, which closes a circuit from relay coil terminal L11 through line 494, switch arm U4, line 486 and switch arm R1 to power line 481.

When relay L has been momentarily energized through either of the circuits just described, a holding circuit is normally established from relay coil terminal L14 via line 495 to switch terminal L9 and through switch arm L7, now in energized position, to line 496. From line 496 the circuit passes through switch terminals N7 and N8, normally connected by push button N4, and via line 497 to switch terminal V5, which is normally connected to switch arm V4 and power line 481. That holding circuit is maintained until either "out" button N4 is momentarily pressed or cam switch V is opened at the set inner limit of easel motion. Then relay L is deenergized and drops back to "out" position.

Pilot lights 500 and 501 indicate the condition of energization of relay L. They are connected on one side to power line 480 and on the other side via lines 502 and 503, respectively, to relay switch terminals L6 and L5. When relay L is deenergized switch arm L4 connects power line 481 to terminal L5, lighting "out" pilot light 501 and indicating that the easel is ready to be started, or is actually moving, out; and when relay L is energized, switch arm L4 opens the circuit to lamp 501 and connects "in" pilot light 500, indicating readiness of the system for inward easel motion.

In operation, the following settings are ordinarily made before the motion is actually started. Either "in" button N1 or out button N4 is momentarily pressed to determine the direction of initial motion, energizing or deenergizing, respectively, relay L. If the easel is to move to a certain limit position and then stop, switch R is set to "stop." If the easel is to reverse automatically after reaching a limit position, and move in the opposite direction, switch R is set to "reverse." Cam levers 452 and 453 are set with reference to dial 436 to the outer and inner limits of motion, respectively, at which actuation of switches U and V is to limit the motion, stopping or reversing it. Speed dials 470 and 471 are set to the speed at which the easel is to move inward and outward, respectively, determining the amplitude of speed signals generated by synchro transformers T13 and T14. In practice, similar adjustments are ordinarily made in the control channels for all three components of easel motion, the adjustments in each channel being independent of the others.

If motion in two or more components is to start simultaneously, panel switches Q are closed in advance in those channels, and the motion is started by closing master switch P. That energizes relay K in each channel in which switch Q is closed, and supplies each hydraulic unit amplifier 415 with the predetermined speed signal from its respective T13 or T14, starting the easel motion. Motion in other coordinates, not initially started, can be introduced as required at any time by closing switches Q in the corresponding channels. When any one of the motions reaches a preset limit, switch U or V is cam actuated, either stopping the motion by deenergizing relay K (if switch R is at "stop"), or reversing the direction of motion by shifting the condition of energization of relay L (if switch R is at "reverse"). In the latter instance the speed in the reversed direction is determined by the setting of the corresponding synchro T13 or T14 and is thus independent of the speed in the initial direction. The direction of motion in one or more coordinates can be manually reversed at any time by momentarily pressing the appropriate button of switch N in the corresponding channel. That reverses the condition of relay L either by closing the described initial energizing circuit between terminals N2 and N3 or by opening the described holding circuit between terminals N7 and N8, shifting control from one of synchros T13 and T14 to the other. The reversed motion then normally continues until modified by switch U or V at the preset limit for motion in that direction. The motion can be stopped manually at any time either in all coordinates at once by opening master switch P; or in any selected coordinates by opening panel switches Q in the corresponding channels. That deenergizes relays K in those channels, taking control away from the speed control voltage from synchro T13 or T14 and substituting the stowing signal from synchro T7. Push button Q4 of panel switch Q is useful for moving the easel a short distance, as in setting it accurately in a desired position.

The operation of the easel mount drive system as so far described is sufficiently accurate and reproducible that it can be used as a repeating system under many conditions encountered in practice. A sequence of motion, automatically performed by the described controls, can be repeated with good accuracy either immediately or at some later time by adjusting the controls to the same settings and allowing them to perform again the same control operations. However, since errors of rate setting, for example, tend to be cumulative in such a system, far greater accuracy is attainable when a recording-repeating mechanism, such as that already described, is used in conjunction with the easel mount drive.

Before describing that procedure in detail, it should be noted that the easel mount drive, as shown in Fig. 11, is adapted for manual control, say by a handwheel as an alternative to the speed and limit controls described. In the longitudinal channel, for example, synchro generator G8 is available for that purpose, linked, as indicated, like generator G7 to the longitudinal easel position. The rotor of generator G8 is connected across alternating current power lines 442, and its stator windings are brought out via lines 510 to terminals 1, 2 and 3 of connector S4. Terminals 4 and 5 of connector S4 are connected respectively to input lines 460 and 461 to hydraulic unit amplifier 415, and connector terminals 6 and 7 are connected respectively to lines 476 and 472, which are normally connected to those input lines by switch W. To operate the easel by a handwheel, such as handwheel 330 in Fig. 10, which is mechanically connected to synchro transformer T3, switch W is opened and handwheel electrical connector S2 (Fig. 10) is plugged into connector S4 in Fig. 11. Corresponding stator windings of easel generator G8 and handwheel transformer T3 are thus connected together via connector terminals 1, 2, and 3, and the transformer error signal, indicating any lack of correspondence between the handwheel position and the easel (longitudinal) position, is supplied through terminals 4 and 5 of the connectors to amplifier 415. The output of that amplifier acts as described to drive the easel carriage assembly 378 in a direction to reduce the error, thus causing the easel to follow any motion imposed manually upon handwheel 330. With that arrangement terminals 6 and 7 of connector S4 remain open, and the output of speed voltage generator 462 is not utilized. Moreover, operation of the easel is independent of the positions of all the normal control switches and relays K, L, N, P, Q, R, U and V. However, it is usually convenient to retain normal operation of indicator dials 436 and 437, merely to indicate the easel position to the operator. That requires energization of relay switch K to transmit the error signal from synchro transformer T7 (via lines 444, switch arms K4 and K7 and lines 445) to servo amplifier 440. That relay will remain energized, independently of cam actuation of switches U and V, if master switch P and panel switch Q are closed and if switch R is in "reverse" position. It will be understood that a separate handwheel is ordinarily to be used to control the easel motion in each coordinate. Alternatively, the motion in one or more coordinates may be controlled by handwheels, and motion in other coordinates may be controlled simultaneously by the speed control voltages generated in the corresponding control channels.

To operate the easel mount in conjunction with recording repeating mechanism 174 of Figs. 6–10, switch W (Fig. 11) is shifted to "outside," switch J (Fig. 10) is shifted to "easel" position and switch E to "single" position, and connectors S3 and S4 are connected together. While the recording-repeating mechanism is thus connected to the easel mount, the camera mount 70 and its amplifier and amplidyne drive 322 and 330 can be electrically disconnected, for example by opening the circuits of Fig. 10 at the points crossed by the dashed lines 512 and 513, which schematically represent connectors.

With S3 and S4 connected, the stator windings of easel synchro generator G8 are connected via lines 510, terminals 1, 2 and 3 of connectors S3 and S4 and lines 515 to the corresponding windings of one-speed synchro transformer T1 in recording-repeating head 176. Hence the error signal from the rotor of T1, transmitted from lines 315 through switch E (in "single" position) to switch arms F1 and F4, represents any lack of correspondence between the longitudinal easel position, for instance, and the position of recording-repeating arm 227. The 4-speed synchro transformer T2 is not utilized, since only a one-speed synchro generator is provided in the present embodiment of the easel mount. If greater accuracy is needed, a 4-speed unit can be provided, as in the camera mount 70 here illustrated.

During recording, with switch F in "record" position, the error signal from T1 is transmitted from switch arms F1 and F4 via lines 321 to the input of recording servo amplifier 320, the output of which drives arm 227 in accordance with the (longitudinal) easel motion, making a continuous record of that motion, whatever it may be. That easel motion is under control of the input to hydraulic unit amplifier 415 (Fig. 11), and the input signal is the speed control voltage from synchro transformer T13 or T14, the generation and control of which has already been described. That signal is transmitted to amplifier 415 from lines 478 and 472, not directly through switch W (which is now open), but through terminals 6 and 7 of connectors S4 and S3, via lines 516 (Fig. 10) to switch terminals F14 and F17, through switch arms F13 and F16, and back via lines 517 and terminals 4 and 5 of connectors S3 and S4 to amplifier input lines 460 and 461 (Fig. 11). Thus the easel mount can be driven in the normal manner as described, and its motion recorded.

To repeat that recorded motion, it is only necessary to shift switch F to "repeat" position. The speed voltage signal from speed voltage generator 462 is then opened at switch terminals F14 and F17, and the input to recording servo amplifier 320 is opened at terminals F2 and F5. The error signal from transformer T1 is transmitted from switch arms F1 and F4 as input signal to hydraulic unit amplifier 415 (Fig. 11) via the following path: jumpers 332, switch arms F7 and F10 (in "repeat" position), lines 326, switch arms J1 and J4 (in "easel" position), lines 518, switch arms F13 and F16 to lines 517, and finally through terminals 4 and 5 of connectors S3 and S4 to amplifier input lines 460 and 461. That error signal now drives the easel mount in such a direction as to reduce the error, and hence in effect to follow the motion of recording-repeating arm 227 as it follows the record 228. Servomotor M2 is preferably disconnected mechanically from arm 227 to reduce the drag, as already described.

Fig. 13 illustrates a typical example of the manner in which additional degrees of freedom can be provided in the relative motion of camera and subject. The subject, which may be of any character, is there indicated as the stationary easel 530, though the subject can itself be movable, as on a controlled, recordable and reproducible movement easel. The camera 74 is mounted on a nodal point mount 70 of the type illustrated in Figs. 2–5, providing rotation about vertical axis 71 and horizontal axis 72 (normal to the plane of Fig. 13) through the nodal point of the camera lens 73. The nodal point mount itself is supported for translational motion in three rectangular coordinates, that motion being provided by the carriage assembly 366 of Fig. 12. For clarity, only the lower portion of the carriage assembly is shown explicitly in Fig. 13, the portion above the line 13—13 being understood to be similar to the corresponding portion of Fig. 12. Easel bracket 365 of Fig. 12 is replaced in Fig. 13 by a bracket 535 carrying a platform 536 adapted to support camera mount 70.

The motion of camera 74 in Fig. 13 is independently controllable in three coordinates of translation, by means of carriage assembly 366 and three channels of control circuitry similar to that of Fig. 11, associated with the respective carriage drives; and in two coordinates of rotation, by means of the mechanism of camera mount 70 and its two channels of associated circuitry, similar to that shown particularly in the upper portion of Fig. 10. To permit recording and repeating of each of those five types of motion, five channels of a recording-repeating mechanism similar to the dual channels 174 in Figs. 6–9, with associated circuitry, are provided, and are associated respectively with each of the two coordinates of the camera mount drive as illustrated in Fig. 10, and with each of the three coordinates of the carriage assembly drive as described and illustrated in Figs. 10 and 11. A three-coordinate system of the same general type is shown in Fig. 1. The same general type of relative movement in five coordinates may be set up, recorded and reproduced, by utilizing the camera operating system which has been first described, and by mounting the subject, whatever it may be, on the controllable, recordable and reproducible carrier (easel) system which has been described.

By combining motions in various coordinates in the manner indicated, substantially any desired relative motion of camera and subject can be produced, and records made of the individual components of the motion. Then, by reproducing each component from its record as has been described, the original motion can be reproduced as many times as is required. The accuracy with which the reproduced motion duplicates the original motion depends primarily upon the quality of engineering and workmanship in the apparatus used. With precision apparatus it has been found practicable to duplicate camera motion within a few minutes of arc, so that any discrepancy between photographic sequences made successively is scarcely greater than the resolution of the photographic process itself. It is thus possible, for example, within the present invention, to utilize even in sequences involving camera motion the various processes of composite photography which were previously confined in practice to static sequences.

Fig. 14 is a schematic plan illustrating a typical manner of producing a composite motion picture in accordance with the invention. One portion of the entire subject is indicated schematically at 540, and represents any typical subject elements, for example a group of actors. A typical second portion of the entire subject is indicated at 545, and may typically comprise a group of buildings. The dashed line 546 represents a division in space and/or time, which may be very simple or relatively complex in form, between the two partial subjects 540 and 545. It is not necessary that the whole of any particular object be on one side or the other of that division, and both partial subjects may in general include moving elements, such as actors. The partial subjects 540 and 545 are illustrated in the relative positions they are to have in the finished picture sequence. They may not, and typically do not, actually exist physically in that relationship. For example, 540 may be a group of actors on a stage and 545 may be part of a distant city.

The camera is shown at 74 in its required relation to each of partial subjects 540 and 545. The arrow 547 represents the rotational camera motion that is to take place during the picture sequence. For clarity, only motion in a horizontal plane (pan) will be considered in detail, it being understood that motion in other coordinates, rotational or translational, can be introduced, as already indicated, when required.

Camera 74 is mounted for rotation about a vertical axis 71 through the nodal point of its lens, for example by means of nodal point mount 70 already described, as indicated schematically in Fig. 14. The various control elements of camera mount 70 are electrically connected, as by a cable 548 to a suitable recording-repeating mechanism and associated circuitry such as has been described, here indicated schematically at 549.

In the present illustrative procedure, partial subjects 540 and 545 are photographed separately on different sections of film, and the resulting images are later combined, by known techniques of composite photography. Such procedure is well known for making sequences not involving camera motion. According to the present invention, in a sequence calling for camera motion, one of the two partial subjects, say 540 (preferably that including the more important action) is photographed first, camera 74 being manipulated in rotation about axis 71 (and in any other coordinates) in any suitable manner, for example by handwheel 136 (Fig. 2). The resulting camera pan motion is recorded by the associated recording-repeating channel 549 in the manner already described. If it is necessary to retake the sequence of subject 540, the camera can be moved through the same motion pattern during each retake by use of the repeating mechanism and the record of the initial motion, as already described; or alternatively, the camera may be controlled manually during each retake, a separate recording being made of each motion pattern.

Partial subject 546 is separately photographed, camera 74 being set in the proper position relative to that partial subject, and the camera motion being driven in accordance with the previously made record of the motion actually used in photographing partial subject 540 (or the particular motion used in the selected retake, if retakes were made with independent motion). The two separately photographed film sections of the respective partial subjects, are then combined into a finished film by the usual procedures. The apparent motions of the two partial subjects in the final composite sequence will be the same as if they had been photographed simultaneously.

The methods by which motion pictures of different or partial subjects are composited to form a single composite picture may generally be described by saying that the partial pictures are "superposed" in registered relation (with the frames or some other points of two or more films registered). The registered superposition may be done physically, optically or photographically, and the term registered superposition as used in the following claims is intended to include any and all such procedures. Examples of such methods may be found for instance in the Williams Patent No. 1,273,435, where the registered superposition is done by printing operations; and in the Pomeroy Patent No. 1,673,019, where the registered superposition is done photographically; or in the commonly used background transparency method where the superposition is photographic and optical.

Since the axis of the rotational camera motion passes through the nodal point of the lens, no spurious relative motion is introduced between objects at different distances or in different directions from the camera. Thus the partial subjects 540 and 545 need not exist at the same scale. For example, 545 can be a small scale, three dimensional model of a group of buildings. The location of camera 74 with respect to partial subject 540 and its relation with respect to partial subject 545 must take account of any difference in scale, in the same manner as in making a similar sequence not involving camera motion.

When a translational component of camera motion is present, produced for example as indicated in Fig. 13, and when the partial subjects are at scales differing by some definite factor, the patterns of camera (translational) motion used in photographing the two partial subjects must differ in scale by the same factor. That is readily done by modifying either the recording-repeating mechanism or the camera position indicating mechanism in an appropriate manner between the recording and the reproducing operations. For example, if a pattern of translational camera motion is recorded while photographing a full scale subject, the motion can be reproduced at small scale by replacing the arm 227 used in recording by a longer arm for the repeating operation; the correct position of the tool 225 with respect to drum 190 being maintained by adjusting head case 215 on bracket 217 as described above. A given lateral motion of tool 225 will then produce a smaller rotational deflection of shaft 230, and hence a smaller camera motion. When the scale is to be shifted by a larger factor than can be conveniently accomplished by changing arm 227, an illustrative procedure is to replace the gears 231 and 232 in recording repeating head 176 (Fig. 8) by gears having a smaller gear ratio, so that shaft 233 will turn more slowly with relation to shaft 230 by the required factor. As arm 227 follows the record groove, synchro transformers T1 and T2 will then turn more slowly (by the required factor) than they did when the record was made, and the motion of the camera moving mechanism will be correspondingly reduced. Alternatively, the gear ratio between synchro generators G7 and G8 (say) and drum 338 (Fig. 12) can be so changed that the camera motion is decreased (by the required factor) with relation to the synchro motion. Other methods of accomplishing the change of scale between initial and repeated motions will be obvious from the above description.

The time scale of the repeated motion can also be made different from that of the motion which was recorded. For example, after a motion sequence has been recorded, a pair of gears in the gear train 188 (Fig. 6), by which the record film is driven from selsyn motor 187, can be replaced by gears with a different speed ratio. The record film 184 will then be driven at a different speed when the motion is reproduced. The result is a reproduction of the original motion which differs from the original motion only in the time scale.

The expression "relative motion of the camera and subject" (or partial subject) refers strictly, both in the specification and in the following claims, to what may be called the frame of reference of the subject, rather than the subject itself. Thus if the partial subject in a particular sequence is an actor seated in a chair, the relative motion involved is ordinarily that of the camera with relation to the chair. Such motion can be controllably produced in accordance with the invention by moving either the camera or the chair or both. Motion of the actor relative to the chair (and hence also relative to the camera) is less readily controllable, and is ordinarily excluded from consideration in connection with the present invention. As a further example, if a camera is panned while photographing a stage coach from a distance, the relative motion with which the present invention is typically concerned is that of the camera with respect to the ground (the frame of reference) and not with respect to the stage coach itself. On the other hand, a stage coach may itself constitute a frame of reference, for example if the camera moves over it at close range to pick out individual passengers. In any actual case the effective frame of reference of the subject is readily identifiable.

The term "subject portion" as here used is intended to include, for example, separate color components of a single subject, which may be photographed successively and later combined into a color sequence.

We claim:

Apparatus for the repetitive production of a definite timed program of orientation shifting of a motion picture camera during exposure of a motion picture film therein, embodying, in combination with the motion picture camera, its film moving mechanism, and a mounting on which the camera is angularly displaceable about an axis to vary its orientation angle with respect to a predetermined datum orientation; an elongate record tape carrying a continuous linear record element which extends longitudinally of the tape, points on said linear record element being variously displaced laterally with respect to a predetermined longitudinal datum axis, the magnitude of said varying lateral displacement representing and corresponding to varying angular displacement of the motion picture camera from a predetermined datum orientation, means for driving the record tape longitudinally in constant timed relation to the film moving mechanism of the camera, a record follower, freely movable laterally of the record tape, and the linear record element and the follower being of such cooperative physical natures that the follower will physically follow the varying lateral displacement of the record element, and connective means linking the follower to the motion picture camera and acting to positively move the camera in angular displacement relative to its datum orientation proportionately to lateral displacements of the record follower with reference to the datum axis of the record.

GILBERT L. STANCLIFF, Jr.
HENRY GORDON JENNINGS.

References Cited in the file of this patent
UNITED STATES PATENTS

| Number | Name | Date |
|---|---|---|
| 1,243,272 | Duhem | Oct. 16, 1917 |
| 1,589,139 | Foley | June 15, 1926 |
| 1,631,450 | Andrews | June 7, 1927 |
| 1,713,503 | Von Madaler | May 14, 1929 |
| 1,737,021 | Pollock | Nov. 26, 1929 |
| 1,869,819 | Mammes | Aug. 2, 1932 |
| 2,040,610 | Huddleston | May 12, 1936 |
| 2,073,998 | Raby | Mar. 16, 1937 |
| 2,147,038 | Jackman | Feb. 14, 1939 |
| 2,213,108 | Pollard | Aug. 27, 1940 |
| 2,232,144 | Sersen | Feb. 18, 1941 |
| 2,293,207 | Haskin et al. | Aug. 18, 1941 |
| 2,475,245 | Leaver et al. | July 5, 1949 |

FOREIGN PATENTS

| Number | Country | Date |
|---|---|---|
| 653,913 | Germany | Dec. 6, 1937 |

OTHER REFERENCES

Heckler et al.: Abstract of Serial No. 702,106, filed October 9, 1946, published November 1, 1949, 628 O. G. 255.